United States Patent
Takaishi

(10) Patent No.: US 7,504,795 B2
(45) Date of Patent: Mar. 17, 2009

(54) HEAD POSITION CONTROL METHOD, HEAD POSITION CONTROL DEVICE, AND DISK DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 33 days.

(21) Appl. No.: 11/650,691

(22) Filed: Jan. 5, 2007

(65) Prior Publication Data

US 2008/0030160 A1    Feb. 7, 2008

(30) Foreign Application Priority Data

Aug. 3, 2006    (JP)    ............................ 2006-212225

(51) Int. Cl.
*G05B 1/06* (2006.01)
(52) U.S. Cl. ...................... 318/652; 318/638; 318/560; 360/77.08; 360/77.04
(58) Field of Classification Search ................. 318/652, 318/638, 560; 360/77.04, 77.08
See application file for complete search history.

(56) References Cited

U.S. PATENT DOCUMENTS

| | | | |
|---|---|---|---|
| 5,404,253 A | 4/1995 | Painter | |
| 6,404,581 B1 * | 6/2002 | Shah | ............................ 360/75 |
| 6,487,028 B1 | 11/2002 | Sri-Jayantha et al. | |
| 6,618,219 B1 * | 9/2003 | Ho | ............................ 360/77.04 |
| 6,636,376 B1 | 10/2003 | Ho | |
| 6,664,751 B1 * | 12/2003 | Gabriel et al. | ............... 318/599 |
| 6,684,114 B1 * | 1/2004 | Erickson et al. | ............... 700/45 |
| 7,035,037 B2 * | 4/2006 | Tao et al. | .................. 360/77.02 |
| 2001/0003497 A1 | 6/2001 | Takaishi | |
| 2003/0058558 A1 | 3/2003 | Ottesen et al. | |
| 2003/0112546 A1 | 6/2003 | Hanson et al. | |
| 2003/0231422 A1 | 12/2003 | Zhang et al. | |

(Continued)

FOREIGN PATENT DOCUMENTS

JP    A 7-14325    1/1995

(Continued)

OTHER PUBLICATIONS

Bickel et al.; "Disturbance Observer Based Hybrid Impedance Control"; Proceedings of the American Control Conference 1995, pp. 729-733.

*Primary Examiner*—Bentsu Ro
*Assistant Examiner*—David S Luo
(74) *Attorney, Agent, or Firm*—Greer, Burns & Crain, Ltd.

(57) ABSTRACT

In a positioning control device based on control of an observer having a disturbance suppression function, a disturbance suppression function according to a head position is added without impairing the control characteristics of the observer. The position control device has an observer having a disturbance suppression function comprising a model of an actuator and a model of disturbance, and a table for storing an estimated gain of the observer according to a position of the head. And an estimated gain is acquired from the table according to the position of the head, and an estimated gain of the observer is changed so as to change the disturbance suppression frequency characteristic. The disturbance suppression characteristic can be optimized according to the position of the head in the radius direction or between disks, and vibration of the head can be prevented even if recording density is increased.

24 Claims, 19 Drawing Sheets

U.S. PATENT DOCUMENTS

2004/0264032 A1 12/2004 Baum et al.
2005/0052777 A1* 3/2005 Toda .................. 360/77.08
2006/0114602 A1 6/2006 Baek et al.
2006/0176605 A1* 8/2006 Baek et al. ............. 360/77.04

FOREIGN PATENT DOCUMENTS

| JP | 07-050075 | 2/1995 |
| JP | 2000-021104 | 1/2000 |
| WO | WO 00/41042 | 7/2000 |

* cited by examiner

FIG. 19

| STATE GAIN | | OUTER | | | INNER | |
|---|---|---|---|---|---|---|
| L | L1 | 0.9597 | | | 0.9624 | |
|  | L2 | 1.1367 | | | 1.1676 | |
|  | L3 | 1.1123 | | | 1.9070 | |
|  | L4 | −0.8014 | | | −1.4973 | |
|  | L5 | −0.6388 | | | −1.1194 | |
| A | | 1 | 1 | 0.5 | 0.5 | 0 |
|  | | 0 | 1 | 1 | 1 | 0 |
|  | | 0 | 0 | 1 | 0 | 0 |
|  | | 0 | 0 | 0 | 0.9976 | −0.0674 |
|  | | 0 | 0 | 0 | 0.06738 | 0.9302 |
| F | | F1 | F2 | F3 | F4 | F5 |
|  | | 0.0019 | 0.0096 | 0.0202 | 0.0202 | 0 |

| | | FIRST HEAD | | | | | SECOND HEAD | | | |
|---|---|---|---|---|---|---|---|---|---|---|
| L | L1 | 0.9616 | | | | L1 | 0.9630 | | | |
| | L2 | 1.1451 | | | | L2 | 1.1576 | | | |
| | L3 | 0.1210 | | | | L3 | 0.1189 | | | |
| | L4 | 0.0188 | | | | L4 | 0.0894 | | | |
| | L5 | 0.1747 | | | | L5 | 0.1796 | | | |
| A | 1 | 1 | 0.5 | 0.5 | 0 | 1 | 1 | 0.5 | 0.5 | 0 |
| | 0 | 1 | 1 | 1 | 0 | 0 | 1 | 1 | 1 | 0 |
| | 0 | 0 | 1 | 0 | 0 | 0 | 0 | 1 | 0 | 0 |
| | 0 | 0 | 0 | 0.5034 | -0.857 | 0. | 0 | 0 | 0.6719 | -0.7339 |
| | 0 | 0 | 0 | 0.857 | 0.4863 | 0 | 0 | 0 | 0.7339 | 0.6498 |
| F | | 0.0019 | | 0.0096 | | 0.0202 | 0.0202 | 0 | | |

HEAD POSITION CONTROL METHOD, HEAD POSITION CONTROL DEVICE, AND DISK DEVICE

CROSS-REFERENCE TO RELATED APPLICATIONS

This application is based upon and claims the benefit of priority from the prior Japanese Patent Application No. 2006-212225, filed on Aug. 3, 2006, the entire contents of which are incorporated herein by reference.

BACKGROUND OF THE INVENTION

1. Field of the Invention

The present invention relates to a head position control method, head position-control device and disk device, and more particularly to a head position control method, head position control device and disk device for suppressing the position shift caused by a disturbance (NRRO) using observer control.

2. Description of the Related Art

It is very important for a disk device, such as a magnetic disk device or optical disk device, to accurately position the head on a target track in order to improve recording density.

For this positioning control, it is known that a disturbance influences the positioning accuracy. To suppress this disturbance by a control system, control systems in FIG. 26 to FIG. 28 are known conventionally. In the first prior art in FIG. 26, a position error 'e' between a target position 'r' and a current position 'y' of a plant 108 is computed by a computing block 100, and is input to a controller 102, and the controller 102 computes a control quantity to decrease the position error 'e'. A filter 104 having a reverse characteristic form of a notch filter is added to this feedback control system for driving the plant 108 in parallel, to suppress a component (RRO component) near a specific frequency of the position error (see U.S. Pat. No. 6,487,028B1).

In the second prior art, a filter 104 is installed in series with the controller 102 in a feedback-loop in FIG. 26, as shown in FIG. 27, so as to suppress a component near a specific frequency of a control quantity of the controller 102 (see R. J. Bickel and M. Tomizuka: "Disturbance observer-based hybrid impedance control", (Proceedings of the American Control Conference, 1995, pp. 729-733)).

In the third prior art, a value when a current position 'y' is divided by a transfer function P of a plant 108 in a block 110, that is a difference between a second order differential value of a position error and a command current value from a computing block 106, is determined by a computing block 112 as a disturbance observer in a feedback loop in FIG. 26, and is fed back to the computing block 106 via a band pass filter (also called a Q filter) 114, as shown in FIG. 28 (see R. J. Bickel and M. Tomizuka: "Disturbance observer-based hybrid impedance control", (Proceedings of the American Control Conference, 1995, pp. 729-733)).

Also in order to handle an eccentricity of a disk, which is the periodic disturbance (RRO), a method for correcting the eccentricity using an eccentricity estimation observer has been proposed (e.g. Japanese Patent Application Laid-Open No. H7-50075 or Japanese Patent Application Laid-Open No. 2000-21104).

Such an eccentricity estimation observer calculates a control value of an actuator from an error between an actual position error and estimated position error, using state estimation gains A, B, C, F and L, and calculates state quantity (position, velocity, bias value, eccentricity) of the next sample.

Here the estimated gain L consists of an estimated position gain L1, estimated velocity gain L2, estimated bias gain L3 and estimated eccentricity gains L4 and L5. And L1, L2 and L3 show characteristics of the controller itself, and L4 and L5 show response characteristics to eccentricity, which is a periodic disturbance.

SUMMARY OF THE INVENTION

Using such an observer, positioning control to follow up a disturbance other than an eccentricity component (RRO component) is desired. In other words, as the recording density of a disk device increases, the influence of subtle vibration on positioning accuracy of the head can no longer be ignored. Particularly vibration of the medium and wind pressure that the head receives by rotation of the medium can no longer be ignored as an NRRO (Non Repeatable Run Out) disturbance of the head and influence on the positioning accuracy of the head.

In the case of the disturbance suppression method of the above mentioned prior arts, the disturbance suppression function can be added without affecting the characteristics of the original control system if the width of the suppression range is set to very narrow when a compensator for selectively suppressing a specific frequency range, such as for eccentricity correction, is added. However, when a suppression width is taken to be wide to support the current demand for adapting various disturbance frequencies or when the suppression frequency is changed according to a parameter, characteristics of the original controller are affected, and adding a desired disturbance suppression function is difficult.

Also in the case of the prior arts, if the disturbance suppression function is added later after one observer is designed, characteristics of the entire control system, pole allocation for example, deviates considerably, and the entire observer must be redesigned. In other words, conventionally a disturbance model is determined first, then the observer, including the controller and disturbance suppression function, is designed, so if a specific disturbance suppression function is added later, the entire observer is influenced and redesigning is required. Therefore the configuration of a system of which suppression characteristic is changed must be designed repeating trial and error, which is extremely difficult.

With the foregoing in view, it is an object of the present invention to provide a head position control method, head position control device and a disk device for suppressing NRRO disturbance without affecting the control characteristics of the observer.

It is another object of the present invention to provide a head position control method, head position control device and a disk device for preventing vibration of the head by effectively suppressing the NRRO disturbance, which changes according to the head position, without affecting the control characteristics.

It is still another object of the present invention to provide a head position control method, head position control device and a disk device for improving a follow up performance of the head by changing the suppression characteristics of the NRRO disturbance without affecting the control characteristics of the observer.

It is still another object of the present invention to provide a head position control method, head position control device and a disk device for improving the read/write characteristics of the head by changing the suppression characteristics of the NRRO disturbance due to wind pressure received by the head, without affecting the control characteristics of the head.

It is still another object of the present invention to provide a head position control method, head position control device and a disk device for improving the read/write characteristics of the head by changing the suppression characteristics of the NRRO disturbance due to vibration of the medium or suspension, without affecting the control characteristics of the observer.

The head position control method of the present invention is a head position control method for controlling a position of a head in a predetermined position of a disk storage medium by an actuator, having: a step of computing a position error from a target position of the head and a current position acquired from the head; a step of computing an estimated position error between the position error and an estimated position of an observer; a step of creating state information using an estimated gain of the observer according to the estimated position error, and computing a control value of the actuator from the state information; and a step of acquiring an estimated gain corresponding to a target position of the head from a table, setting the estimated gain in the observer and changing the disturbance suppression frequency.

The disk device of the present invention has: a head for at least reading data on a disk storage medium; an actuator for positioning the head in a predetermined position of the disk storage medium; a control unit for computing a position error from a target position of the head and a current position acquired from the head, computing an estimated position error between the position error and an estimated position of an observer, creating state information using an estimated gain of the observer according to the estimated position error, and computing a control value of the actuator from the state information; and a table for storing an estimated gain corresponding to a target position of the head. And the control unit acquires the estimated gain corresponding to the target position from the table, sets the estimated gain in the observer, and changing the disturbance suppression frequency.

The head position control device of the present invention is a head position control device for positioning a head for at least reading data of a disk storage medium in a predetermined position of the disk storage medium by controlling an actuator, having: a control unit for computing an estimated position error between a target position of the head and a current position acquired from the head, creating state information using an estimated gain of an observer according to an estimated position error between the position error and an estimated position of the observer, and computing a control value of the actuator of the state information; and a table for storing an estimated gain corresponding to a target position of the head. And the control unit acquires the estimated gain corresponding to the target position from the table, sets the estimated gain in the observer, and changes the disturbance suppression frequency.

In the present invention, it is preferable that the change step further has a step of changing suppression frequency characteristics of NRRO (Non Repeatable Run Out) disturbance.

Also in the present invention, it is preferable that the change step further has a step of acquiring an estimated gain corresponding to the position of the head on the disk in the radius direction from a table, and changing suppression frequency characteristic of wind disturbance of the observer.

Also in the present invention, it is preferable that the change step further has step of acquiring an estimated gain corresponding to a head number which indicates a position of the disk face for the head, and changing a peak of the suppression frequency of the observer.

Also in the present invention, it is preferable that the step of computing the control value further has a step of creating state information using an estimated gain of a controller and an estimated gain of a disturbance model defined by a transfer function for which a denominator is a numerator of a filter, of which degrees of a denominator and the numerator are the same, for shaping a sensitivity function, and computing the control value including a disturbance suppression value of the actuator from the state information.

Also in the present invention, it is preferable that the step of computing the control value further has: a step of creating state information using an estimated gain of the controller according to the estimated position error and computing a control value of the actuator from the state information; a step of creating state information using an estimated gain of a disturbance model defined by a transfer function for which a denominator is a numerator of a filter, of which degrees of a denominator and the numerator are the same, for shaping a sensitivity function according to the estimated position error, and computing a disturbance suppression value of the actuator from the state information; and a step of adding the control value and the disturbance suppression value to compute a drive value of the actuator.

Also in the present invention, it is preferable that the step of computing the disturbance suppression value further has a step of creating state information using an estimated gain of a disturbance model having a zero point of the numerator of the filter for shaping the sensitivity function according to a desired disturbance frequency as a pole, and computing the disturbance suppression value of the actuator from the state information.

Also in the present invention, it is preferable that the step of computing the disturbance suppression value further has a step of creating state information using an estimated gain of a disturbance model for which a denominator is the numerator of the first degree or second degree filter for shaping the sensitivity function according to a desired disturbance frequency, and computing the disturbance suppression value of the actuator from the state information.

Since the estimated gain of the observer having the disturbance suppression function is changed according to the position of the head, so as to change the disturbance suppression frequency characteristic, the disturbance suppression characteristic can be optimized according to the position of the head in the radius direction or between disks, and the vibration of the head can be prevented even if recording density is increased, therefore positioning accuracy can be improved.

BRIEF DESCRIPTION OF THE DRAWINGS

FIG. 19 is a table according to the embodiment in FIG. 6.

FIG. 22 is another table according to the embodiment in FIG. 6.

DESCRIPTION OF THE PREFERRED EMBODIMENTS

Embodiments of the present invention will now be described in the sequence of the disk device, first embodiment of the position control system, design of the position control system, table of the first embodiment, second embodiment of the position control system, and other embodiments, but the present invention is not limited to these embodiments.

Disk Device

Figure 1:
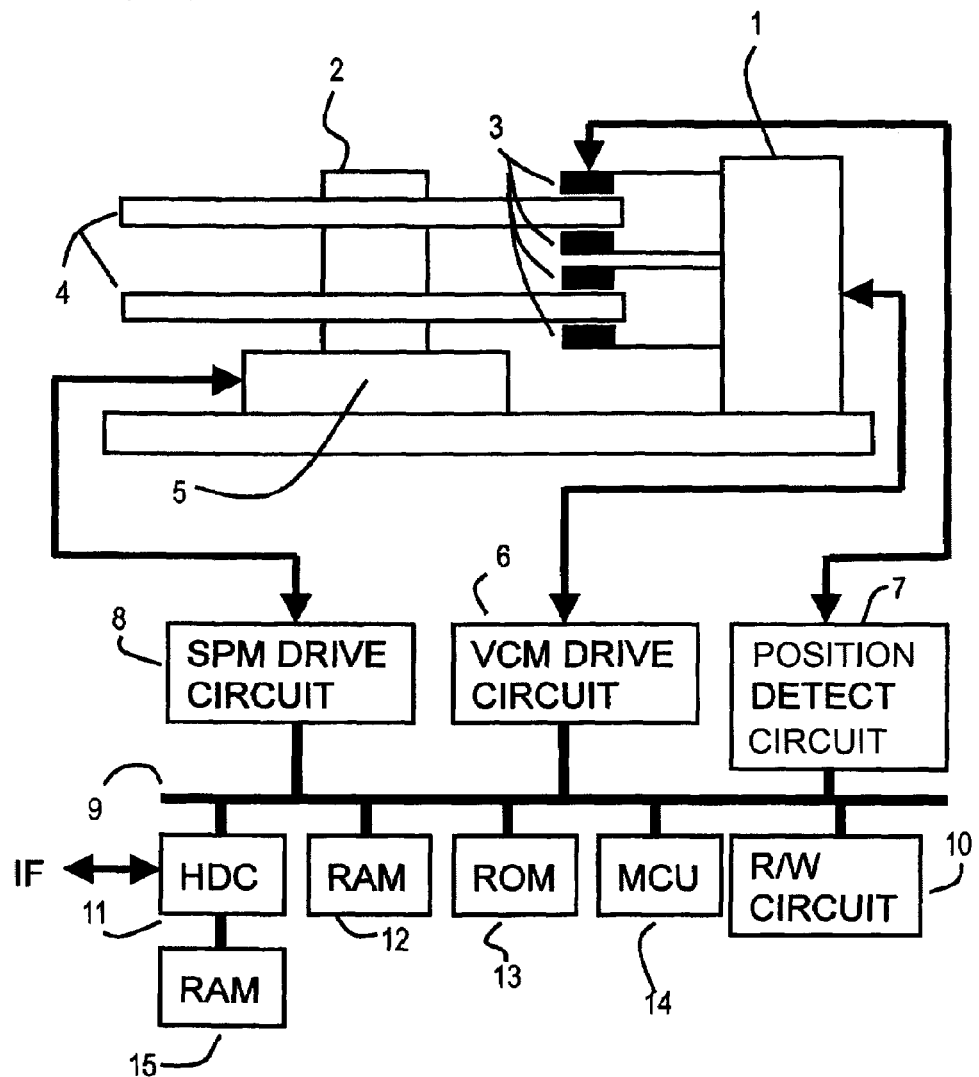
FIG. 1 is a block diagram depicting a disk device according to an embodiment of the present invention.
Figure 2:
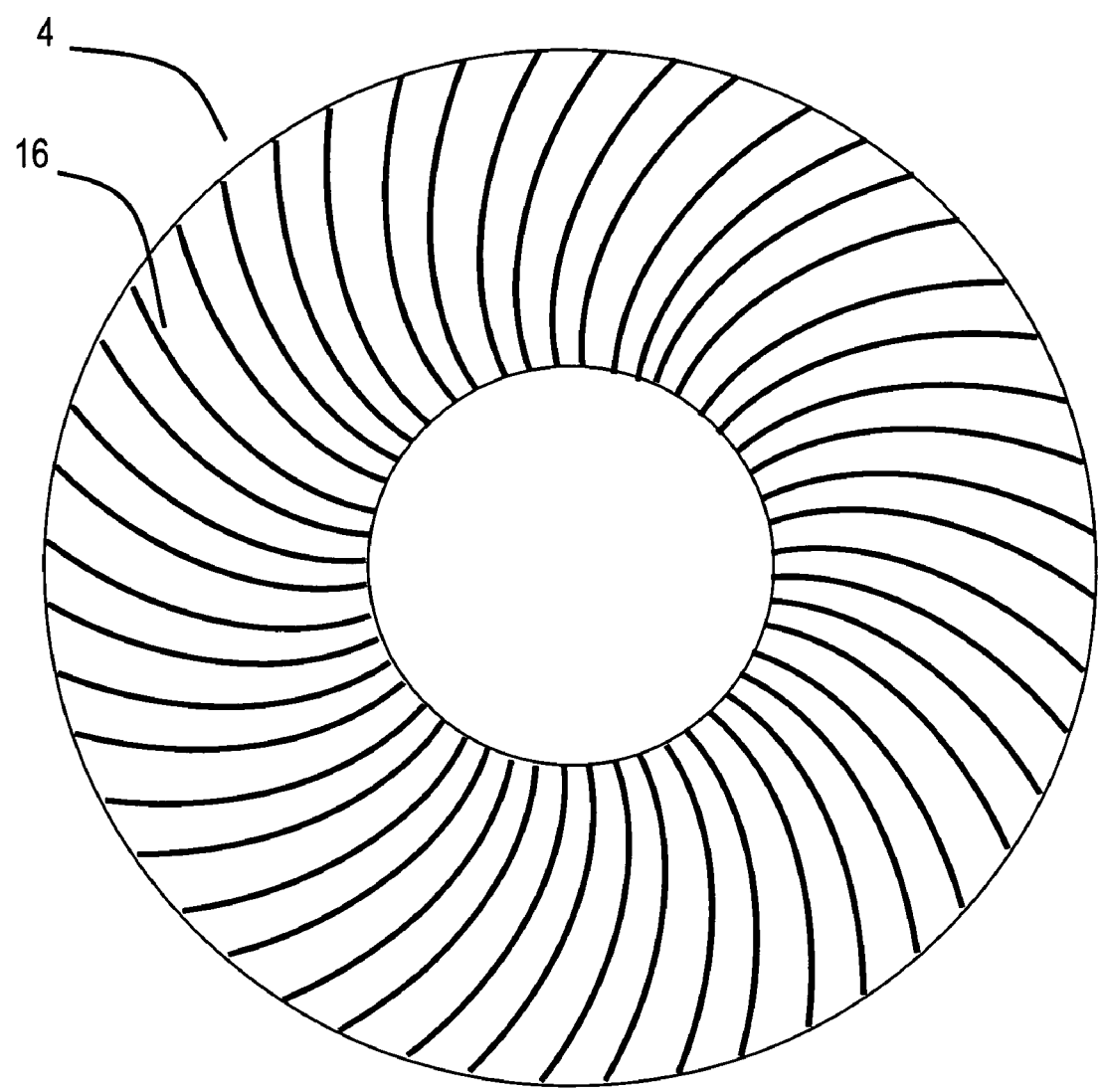
FIG. 2 is a diagram depicting the position signals of the disk in FIG. 1.
Figure 3:
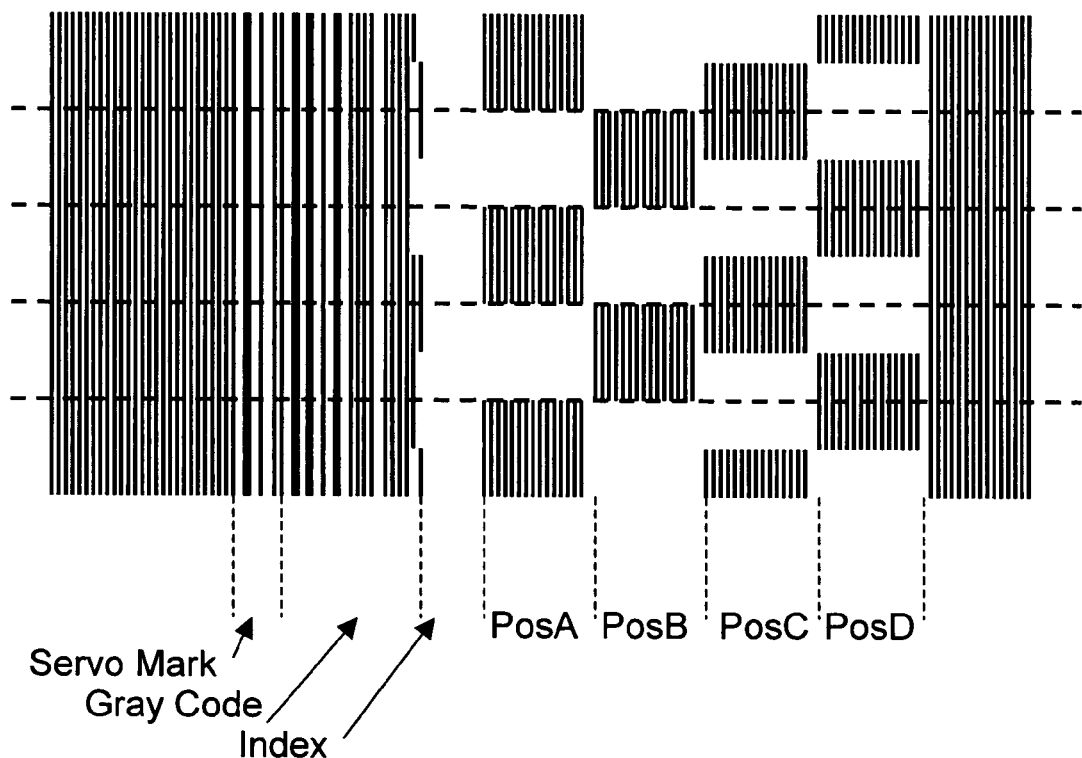
FIG. 3 is a diagram depicting details of the position signals in FIG. 2.
Figure 4:
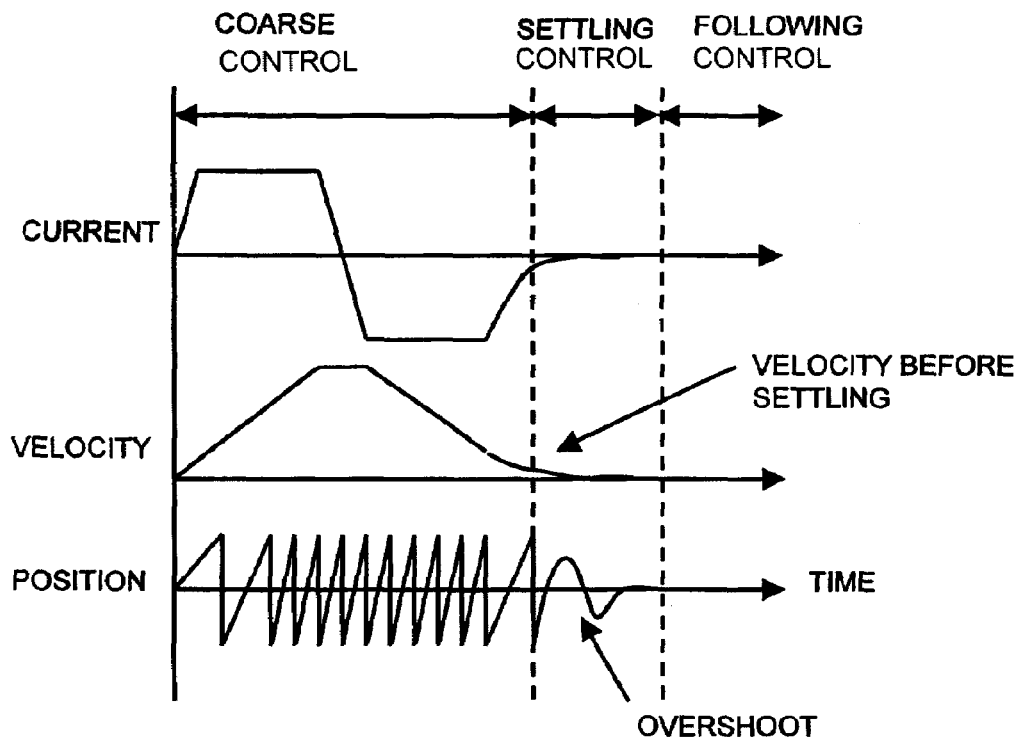
FIG. 4 is a diagram depicting the transition of the seek control in FIG. 1.
Figure 5:
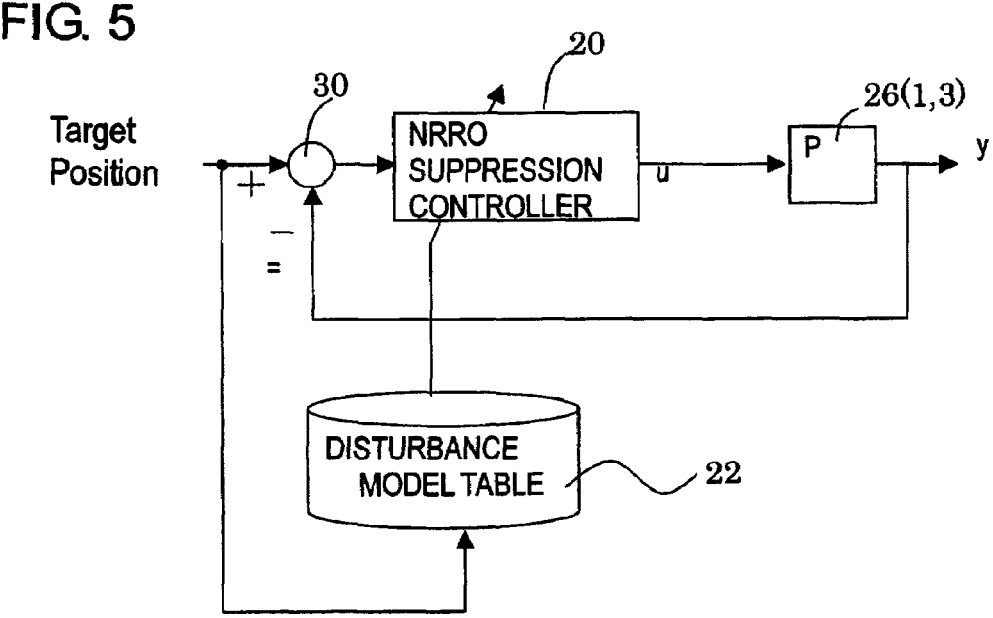
FIG. 5 is a block diagram depicting a position control system of the present invention.

FIG. 1 is a block diagram depicting the disk device according to an embodiment of the present invention, FIG. 2 is a diagram depicting the arrangement of the position signals of the magnetic disk in FIG. 1, FIG. 3 is a diagram depicting the position signals of the magnetic disk in FIG. 1 and FIG. 2, FIG. 4 is a diagram depicting the transition of the seek operation in FIG. 1, and FIG. 5 is a block diagram depicting the position control system in FIG. 1.

FIG. 1 shows a magnetic disk device as a disk device. As FIG. 1 shows, a magnetic disk 4, which is a magnetic storage medium, is installed at a rotation axis 2 of a spindle motor 5. The spindle motor 5 rotates a magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1.

The magnetic head 3 has a read element and a write element. The magnetic head 3 is comprised of a read element, including a magneto-resistance (MR) element, stacked on a slider, and write element, including a write coil, stacked thereon.

A position detection circuit 7 converts position signals (analog signals) read by the magnetic head 3 into digital signals. A read/write (R/W) circuit 10 controls reading and writing of the magnetic head 3. A spindle motor (SPM) drive circuit 8 drives the spindle motor 5. A voice coil motor (VCM) drive circuit 6 supplies drive current to the voice coil motor (VCM) 1, and drives the VCM 1.

A microcontroller (MCU) 14 detects (demodulates) the current position from the digital position signals from the position detection circuit 7, and computes a VCM drive command value according to an error between the detected current position and a target position. In other words, the microcontroller 14 performs position demodulation and servo control, including disturbance suppression described in FIG. 5 and latter. A read only memory (ROM) 13 stores a control program of the MCU 14. A random access memory (RAM) 12 stores data for processing of the MCU 14.

A hard disk controller (HDC) 11 judges a position in one track based on a sector number of a servo signal, and records/reproduces the data. A random access memory (RAM) for buffer 15 temporarily stores the read data or write data. The HDC 11 communicates with a host via an interface IF, such as USB (Universal Serial Bus), ATA (AT Attachment) or SCSI (Small Computer System Interface). A bus 9 connects these composing elements.

As FIG. 2 shows, on the magnetic disk 4, servo signals (position signals) 16 are arrayed in each track in the circumference direction from the outer circumference to the inner circumference with an equal interval. Each track has a plurality of sectors, and the solid lines in FIG. 2 indicate a position where the servo signals 16 are recorded. As FIG. 3 shows, the position signal is comprised of a servo mark ServoMark, track number GrayCode, index Index, and offset information (servo burst) PosA, PosB, PosC and PosD. The dotted line in FIG. 3 shows the track center.

The position signals in FIG. 3 are read by the head 3, and the position of the magnetic head in the radius direction is detected using the track number GrayCode and the offset information PosA, PosB, PosC and PosD. Also the position of the magnetic head in the circumference direction is acquired based on the index signal Index.

For example, the sector number when the index signal is detected is set to No. 0, which is counted up every time the servo signal is detected, so as to acquire the sector number of each sector of the track. The sector number of the servo signal is used as a reference when data is recorded and reproduced. There is one index signal in one track. The sector number may be set instead of the index signal.

The MCU 14 in FIG. 1 confirms the position of the actuator 1 through the position detection circuit 7, performs servo computation, and supplies appropriate current to the VCM 1. In other words, as FIG. 4 shows, in seek control, the head is moved to the target position through the transition from coarse control, settling control and following control. For all these controls, the position of the head must be detected.

To confirm the position like this, the servo signals are recorded on the magnetic disk in advance, as mentioned in FIG. 2. In other words, as FIG. 3 shows, servo marks which indicate the start position of the servo signal, gray code which indicates the track number, index signal, and signals PosA to PosD which indicate the offset are recorded on the magnetic disk in advance. These signals are read by the magnetic head, and these servo signals are converted into digital values by the position detection circuit 7.

As FIG. 5 shows, the position control system of which the MCU 14 in FIG. 1 executes has a computing block 30, a controller 20 having a disturbance suppression function, and a table 22 for changing an internal variable of a disturbance suppression controller 20 corresponding to a target position.

The computing block 30 computes an actual position error er[k] by subtracting the target position 'r' from an observation position y[k] which was acquired by demodulating the above mentioned servo information read by the head 3. The disturbance suppression controller 20 computes a control quantity of the plant 26 (actuator 1 in FIG. 1) from the actual position error according to the internal variable, and drives the plant 26.

In the present invention, a table (conversion unit) 22 for storing the internal variables according to the target position (cylinder position of the head or the head number) is installed, and the disturbance suppression internal variable of the disturbance suppression controller 20 is changed in the table 22 according to the target position. In other words, the controller 20 is constructed such that the disturbance suppression characteristic can be changed according to the internal variable, and also has a change unit 22 for changing the internal variable of the controller 20 according to the target position.

First Embodiment of Position Control System

Figure 6:
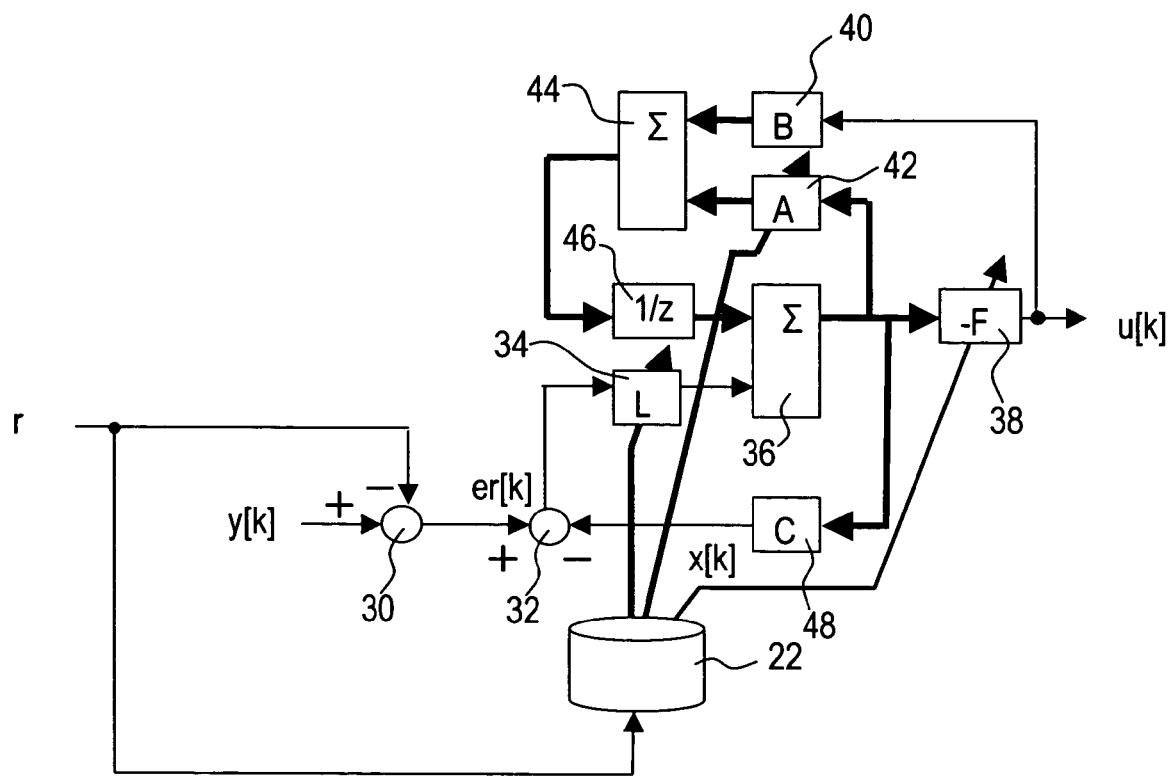
FIG. 6 is a block diagram depicting a position control system according to the first embodiment of the present invention.

FIG. 6 is a block diagram depicting a first embodiment of the position control system for suppressing the disturbance in FIG. 5. This position control system is an observer control system which detects the disturbance frequency, and suppresses the disturbance by adaptive control.

The observer shown in FIG. 6 is a current observer which includes bias compensation shown in the following Expressions (1), (2) and (3).

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix} (y(k) - x(k)) \quad (1)$$

$$u(k) = -(F1 \quad F2 \quad F3 \quad F4 \quad F5) \begin{pmatrix} x(k) \\ v(k) \\ b(k) \\ z1(k) \\ z2(k) \end{pmatrix} \quad (2)$$

$$\begin{pmatrix} x(k+1) \\ v(k+1) \\ b(k+1) \\ z1(k+1) \\ z2(k+1) \end{pmatrix} = \begin{pmatrix} 1 & 1 & 1/2 & 1/2 & 0 \\ 0 & 1 & 1 & 1 & 0 \\ 0 & 0 & 1 & 0 & 0 \\ 0 & 0 & 0 & a11 & a12 \\ 0 & 0 & 0 & a21 & a22 \end{pmatrix} \begin{pmatrix} x(k) \\ v(k) \\ b(k) \\ z1(k) \\ z2(k) \end{pmatrix} + \begin{pmatrix} 1/2 \\ 1 \\ 0 \\ 0 \\ 0 \end{pmatrix} \frac{Bl}{m} \frac{1}{Lp} T^2 u(k) \quad (3)$$

In other words, this embodiment is an example of the position control system based on an observer including a model of the controller and a disturbance model. In FIG. 6, composing elements the same as FIG. 5 are denoted with the same reference symbols. In FIG. 6, the first computing block 30 computes an actual position error er[k] by subtracting a target position 'r' from an observation position y[k] which is acquired by demodulating the above mentioned servo information read by the head 3. The second computing block 32 computes an estimated position e[k] by subtracting an estimated position x[k] of the observer from the actual position error er[k].

A state estimation block 34 computes an estimated correction value (right hand side of Expression (1)) using the estimated position error e[k] and an estimated gain L (L1, L2, L3, L4 and L5) which is an internal variable. And an addition block 36 adds the estimated correction value and the state quality (left hand side of Expression (1)) from a delay block 46 x[k], v[k], b[k], z1[k] and z2[k], and as per Expression (1) acquires an estimated position x[k], estimated velocity v[k], estimated bias value b[k] and estimated disturbance suppression values z1[k] and z2[k]. In Expression (1), the estimated position error e[k] is indicated by (y[k]−x[k]).

This estimated value is multiplied by a state feedback gain (−Fa=F1, F2, F3, F4 and F5) in the fourth computing block 38, and a drive value u[k] of the actuator 1 is acquired as shown in Expression (2). On the other hand, the estimated value of Expression (1) from the addition block 36 is multiplied by an estimated gain Aa (matrix in the left hand side of Expression (3)) in the fifth computing block 42, and the drive value u[k] of the fourth computing block 38 is multiplied by an estimated gain B (value which u[k] is multiplied by in Expression (3)) in the sixth computing block 40. Both of these multiplication results are added in the addition block 44, and estimated state quantities x[k+1], v[k+1], b[k+1], z1[k+1] and z2[k+1] of the next sample of Expression (3) are acquired.

The estimated state quantity of the next sample is input to the delay block 46, and is corrected by the estimated correction value in the state estimation block 34, as described above. And for the estimated value of Expression (1) from the addition block 36, the estimated position x[k] is acquired in the seventh computing block 48, and is input to the above mentioned second computing block 32.

The target position 'r', on the other hand, is input to a conversion table 22. As described in FIG. 17 and later, the conversion table 22 stores the estimated gain L, matrix A and feedback gain F corresponding to the target position 'r'. And the conversion table 22 acquires the estimated gain L, matrix A and feedback gain F corresponding to the target position 'r' and sets them in blocks 34, 42 and 38. By this, the disturbance suppression characteristic of the observer is changed according to the position.

This observer is constructed such that changing the estimated disturbance gain does not affect the characteristic of the original controller. The design method thereof will now be described.

Design Method for Positioning Control System

The design method for an observer including this disturbance model will be described with reference to FIG. 7 and FIG. 8.

First the first design method will be described with reference to FIG. 7.

(S10) An original controller is designed using observer control. In other words, a control target model is set.

(S12) Then a filter form for shaping is determined. In other words, the number of shaping filters and pole and zero point of an individual filter are set. The filter form for shaping must be a first degree or second degree filter, and the degrees of the numerator and denominator are the same.

(S14) Then using the zero point of the shaping filter, a disturbance model of which a denominator is an expression of the numerator of the filter is created.

(S16) This disturbance model is added to the model of the observer in step S10. Adding this disturbance model means that the zero point of the sensitivity function is specified.

(S18) Then the poles of the entire observer control system are specified. These poles include the poles used for original design and the pole of the filter for shaping. In other words, the poles are assigned for an enlarged model (entire model) including the pole of the shaping filter, and the estimated gains L1 to L5 of the observer and matrix A are designed.

(S20) Pole assignment is performed only for the control target model, and the state feedback gain F is designed.

(S22) The feedback gain of the integrated model is designed by adding the output gain of the disturbance model to the state feedback gain. In this way, the observer including the disturbance model is designed.

In other words, in the present invention, the performance to suppress positional disturbance, external vibration and shock is judged by the sensitivity function and acceleration disturbance characteristics. Therefore a desired disturbance suppression function is added by designing the forms of the sensitivity function and acceleration disturbance characteristics.

Now the design procedure will be described using an example. The observer control system when the actuator 1 is a double integral model is given by the following analog expression Expression (4).

$$s\begin{pmatrix}x\\v\end{pmatrix}=\begin{pmatrix}0&1\\0&0\end{pmatrix}\begin{pmatrix}x\\v\end{pmatrix}+\frac{Bl}{m}\begin{pmatrix}0\\1\end{pmatrix}u+\begin{pmatrix}L1\\L2\end{pmatrix}(y-x) \quad (4)$$

$$y=(1\ 0)\begin{pmatrix}x\\v\end{pmatrix}$$

$$u=-(Fx\ Fv)\begin{pmatrix}x\\v\end{pmatrix}$$

In Expression (4), 's' is a Laplace operator, 'x' is an estimated position, 'v' is an estimated velocity, 'y' is a current position, 'r' is a target position, L1 and L2 are estimated gains of position and velocity respectively, 'u' is a drive current, and B1/m is a force constant of the actuator 1.

Then this control system has a sensitivity function $1/(1+CP)$, and the disturbance suppression for this sensitivity function is defined by the first degree filter in the following Expression (5), and the sensitivity function is shaped by this first degree filter.

$$\frac{s+\omega_1}{s+\omega_2} \quad (5)$$

In other words, the sensitivity function when this filter is provided has a form when $1/(1+CP)$ is multiplied by Expression (5).

At this time, a model of the transfer function of the following Expression (6), of which a denominator is a numerator of the filter of Expression (5), is set up in the observer.

$$\frac{1}{s+\omega_1} \quad (6)$$

The denominator ($\omega_2$) of the filter of Expression (5) is used for pole assignment.

By setting up this disturbance model in the observer of Expression (4), the following Expression (7) is acquired from Expression (4).

$$s\begin{pmatrix}x\\v\\b\end{pmatrix}=\begin{pmatrix}0&1&0\\0&0&1\\0&-\omega_1&0\end{pmatrix}\begin{pmatrix}x\\v\\b\end{pmatrix}+\frac{Bl}{m}\begin{pmatrix}0\\1\\0\end{pmatrix}u+\begin{pmatrix}L1\\L2\\L3\end{pmatrix}(y-x) \quad (7)$$

$$y=(1\ 0\ 0)\begin{pmatrix}x\\v\\b\end{pmatrix}$$

$$u=-(Fx\ Fv\ K)\begin{pmatrix}x\\v\\b\end{pmatrix}$$

$$K=\frac{m}{Bl}$$

Above 'b' in the Expression (7) is an estimated disturbance value, and is indicated by a parameter of an estimated steady bias value. In the Expression (7), in order to design the estimated gains L1, L2 and L3 of the observer, the pole (denominator): $-\omega_2$ of the shaping filter of Expression (5) is specified along with the pole used for designing the original observer in Expression (4).

In the Expression (7), the feedback gain is designed only for (Fx and Fv). The disturbance model can be observed but cannot be controlled, so the feedback gain of the disturbance model cannot be changed. For the disturbance model, the same one used for designing the estimated gain of the observer is specified. In the Expression (7), the feedback gain (output gain) of the disturbance model is K=m/B1.

In this way, the original controller is designed in the observer control, and the filter form for shaping according to the disturbance frequency to be suppressed is determined. Here the shaping filter is a first degree or second degree filter, and the degrees of the numerator and denominator must be the same.

If the degrees of the numerator and denominator of the filter are different, and if the degree of the denominator is larger than the degree of the numerator ($\omega_1/s+\omega_2$), for example, the gain of the frequency characteristic of this filter decreases as frequency increases, and if the original sensitivity function is multiplied by this gain, the original sensitivity function (that is, characteristic of the controller) changes considerably.

And the disturbance model, of which a denominator is the expression of the numerator of the filter, is constructed and added to the model of the observer (Expression (7)). Adding this disturbance model means specifying the zero point of the sensitivity function.

Then the poles of the entire observer control system are specified, as mentioned above. These poles includes the poles used for the models of the original controller and the pole ($-\omega_2$) of the filter for shaping.

In other words, the frequency characteristic to introduce for disturbance suppression is defined by the shaping filter, and the disturbance model, of which a denominator is the expression of the numerator of the shaping filter, is constructed and added to the model of the original observer. By this, the disturbance suppression function can be set up without affecting the characteristic of the original controller, even when the suppression width is taken to be wide or when the disturbance in a high frequency area is suppressed.

Even when the disturbance suppression function is added after designing one observer, deviation of the characteristics in the entire control system is small, and redesigning the entire observer is unnecessary.

Now the case when the shaping filter is a second degree filter will be described. The second degree filter is defined by the following Expression (8).

$$\frac{s^2 + 2\varsigma_1\omega_1 s + \omega_1^2}{s^2 + 2\varsigma_2\omega_2 s + \omega_2^2} \quad (8)$$

As mentioned above, the disturbance model, of which a denominator is the expression of the numerator of the shaping filter, is expressed by the following Expression (9).

$$\frac{1}{s^2 + 2\varsigma_1\omega_1 s + \omega_1^2} \quad (9)$$

There are three possible methods to set up this disturbance model in the observer of the original controller (Expression (4)).

The first method is setting up the disturbance model in Expression (9) as is, just like the case of Expression (7). In other words, because of the second degree filter, the observer is given by Expression (10), where the state estimate quantities of disturbance are z1 and z2, and the estimated gains of the disturbance are L3 and L4.

$$s\begin{pmatrix} x \\ v \\ z1 \\ z2 \end{pmatrix} = \begin{pmatrix} 0 & 1 & 0 & 0 \\ 0 & 0 & 1 & 0 \\ 0 & 0 & 0 & 1 \\ 0 & 0 & -\omega_1^2 & -2\varsigma_1\omega_1 \end{pmatrix}\begin{pmatrix} x \\ v \\ z1 \\ z2 \end{pmatrix} + \frac{Bl}{m}\begin{pmatrix} 0 \\ 1 \\ 0 \\ 0 \end{pmatrix}u + \begin{pmatrix} L1 \\ L2 \\ L3 \\ L4 \end{pmatrix}(y-x) \quad (10)$$

$$y = (1\ 0\ 0\ 0)\begin{pmatrix} x \\ v \\ z1 \\ z2 \end{pmatrix}$$

$$u = -(Fx\ Fv\ K\ 0)\begin{pmatrix} x \\ v \\ z1 \\ z2 \end{pmatrix}$$

$$K = \frac{m}{Bl}$$

The second method is dispersing the term of the square of $\omega_1$, and Expression (11) is acquired by transforming Expression (10).

$$s\begin{pmatrix} x \\ v \\ z1 \\ z2 \end{pmatrix} = \begin{pmatrix} 0 & 1 & 0 & 0 \\ 0 & 0 & 1 & 0 \\ 0 & 0 & 0 & \omega_1 \\ 0 & 0 & -\omega_1 & -2\varsigma_1\omega_1 \end{pmatrix}\begin{pmatrix} x \\ v \\ z1 \\ z2 \end{pmatrix} + \frac{Bl}{m}\begin{pmatrix} 0 \\ 1 \\ 0 \\ 0 \end{pmatrix}u + \begin{pmatrix} L1 \\ L2 \\ L3 \\ L4 \end{pmatrix}(y-x) \quad (11)$$

$$y = (1\ 0\ 0\ 0)\begin{pmatrix} x \\ v \\ z1 \\ z2 \end{pmatrix}$$

$$u = -(Fx\ Fv\ K\ 0)\begin{pmatrix} x \\ v \\ z1 \\ z2 \end{pmatrix}$$

$$K = \frac{m}{Bl}$$

The third method is inverting the sign of $\omega_1$ in Expression (11), and is given by Expression (12).

$$s\begin{pmatrix} x \\ v \\ z1 \\ z2 \end{pmatrix} = \begin{pmatrix} 0 & 1 & 0 & 0 \\ 0 & 0 & 1 & 0 \\ 0 & 0 & 0 & -\omega_1 \\ 0 & 0 & \omega_1 & -2\varsigma_1\omega_1 \end{pmatrix}\begin{pmatrix} x \\ v \\ z1 \\ z2 \end{pmatrix} + \frac{Bl}{m}\begin{pmatrix} 0 \\ 1 \\ 0 \\ 0 \end{pmatrix}u + \begin{pmatrix} L1 \\ L2 \\ L3 \\ L4 \end{pmatrix}(y-x) \quad (12)$$

$$y = (1\ 0\ 0\ 0)\begin{pmatrix} x \\ v \\ z1 \\ z2 \end{pmatrix}$$

$$u = -(Fx\ Fv\ K\ 0)\begin{pmatrix} x \\ v \\ z1 \\ z2 \end{pmatrix}$$

$$K = \frac{m}{Bl}$$

Design is possible by any of these methods. The second and third methods are effective particularly when the model is transformed into a digital control system. In other words, the two state variables z1 and z2 are balanced, and the values of the estimated gains L3 and L4 of the observer for the two state variables are not very far apart.

At this time, the values of the estimated gains L1, L2, L3 and L4 are designed by specifying the poles combining the pole of the shaping filter of Expression (8) (derived from denominator=0 in Expression (8)) and the poles used for designing the original observer control system.

The observer control system combining the second degree filter shaping and conventional steady bias estimation is given by the following Expression (13).

$$s\begin{pmatrix} x \\ v \\ b \\ z1 \\ z2 \end{pmatrix} = \begin{pmatrix} 0 & 1 & 0 & 0 & 0 \\ 0 & 0 & 1 & 1 & 0 \\ 0 & 0 & 0 & 0 & 0 \\ 0 & 0 & 0 & 0 & \omega_1 \\ 0 & 0 & 0 & -\omega_1 & -2\varsigma\omega_1 \end{pmatrix}\begin{pmatrix} x \\ v \\ b \\ z1 \\ z2 \end{pmatrix} + \frac{Bl}{m}\begin{pmatrix} 0 \\ 1 \\ 0 \\ 0 \\ 0 \end{pmatrix}u + \begin{pmatrix} L1 \\ L2 \\ L3 \\ L4 \\ L5 \end{pmatrix}(y-x) \quad (13)$$

$$y = (1\ 0\ 0\ 0\ 0)\begin{pmatrix} x \\ v \\ b \\ z1 \\ z2 \end{pmatrix}$$

$$u = -(Fx\ Fv\ K\ K\ 0)\begin{pmatrix} x \\ v \\ b \\ z1 \\ z2 \end{pmatrix}$$

$$K = \frac{m}{Bl}$$

In this way, the filter form for shaping is considered first, then the disturbance model is added to the observer in designing. Therefore forms can be freely shaped without being limited by the physical response characteristic of the original disturbance model.

Figure 7:
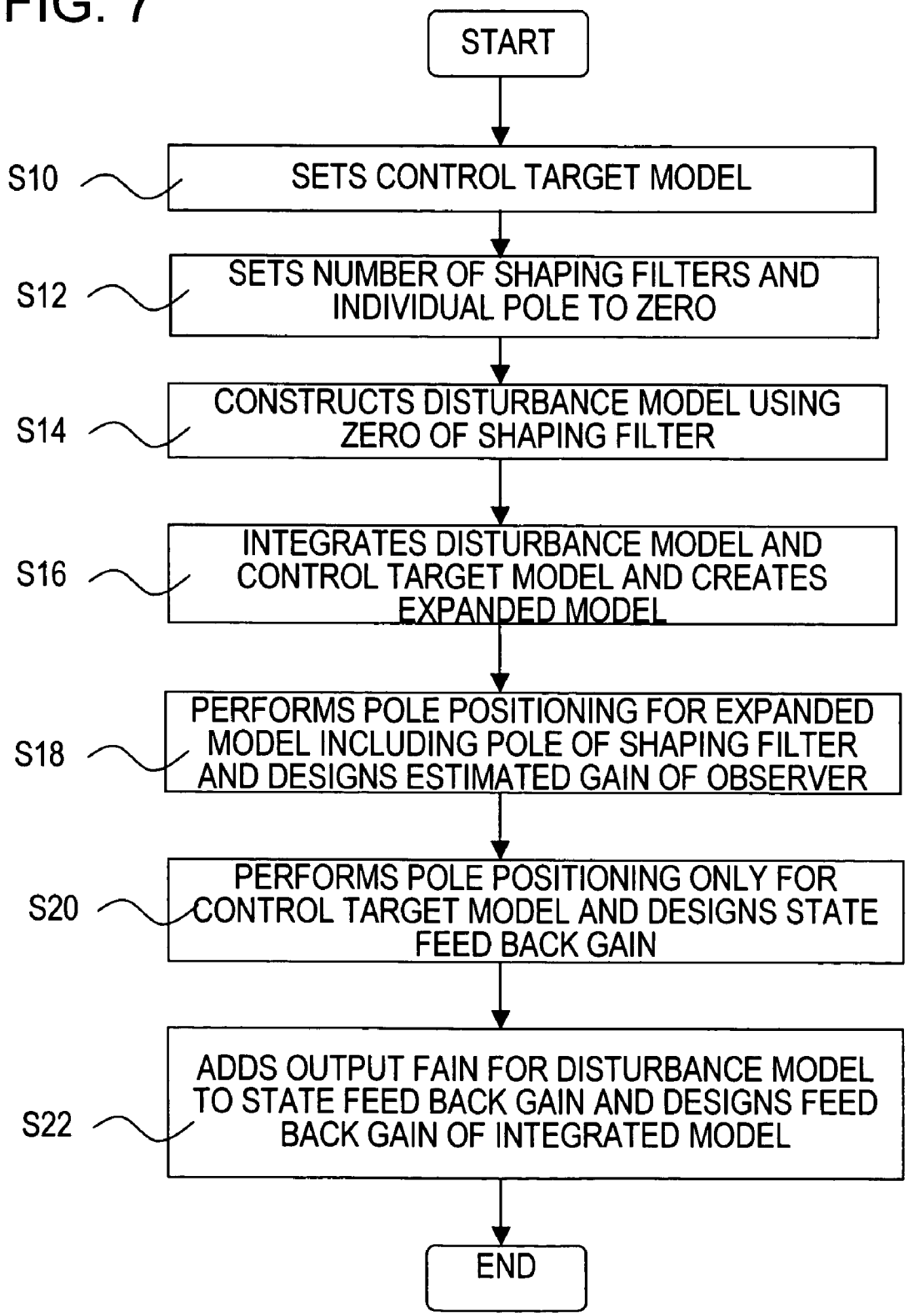
FIG. 7 is a flow chart depicting the analog design procedure of the disturbance observer in FIG. 6.

FIG. 7 is for the description of analog design. On the other hand, the design flow in FIG. 8 is used to design a digital control system.

Figure 8:
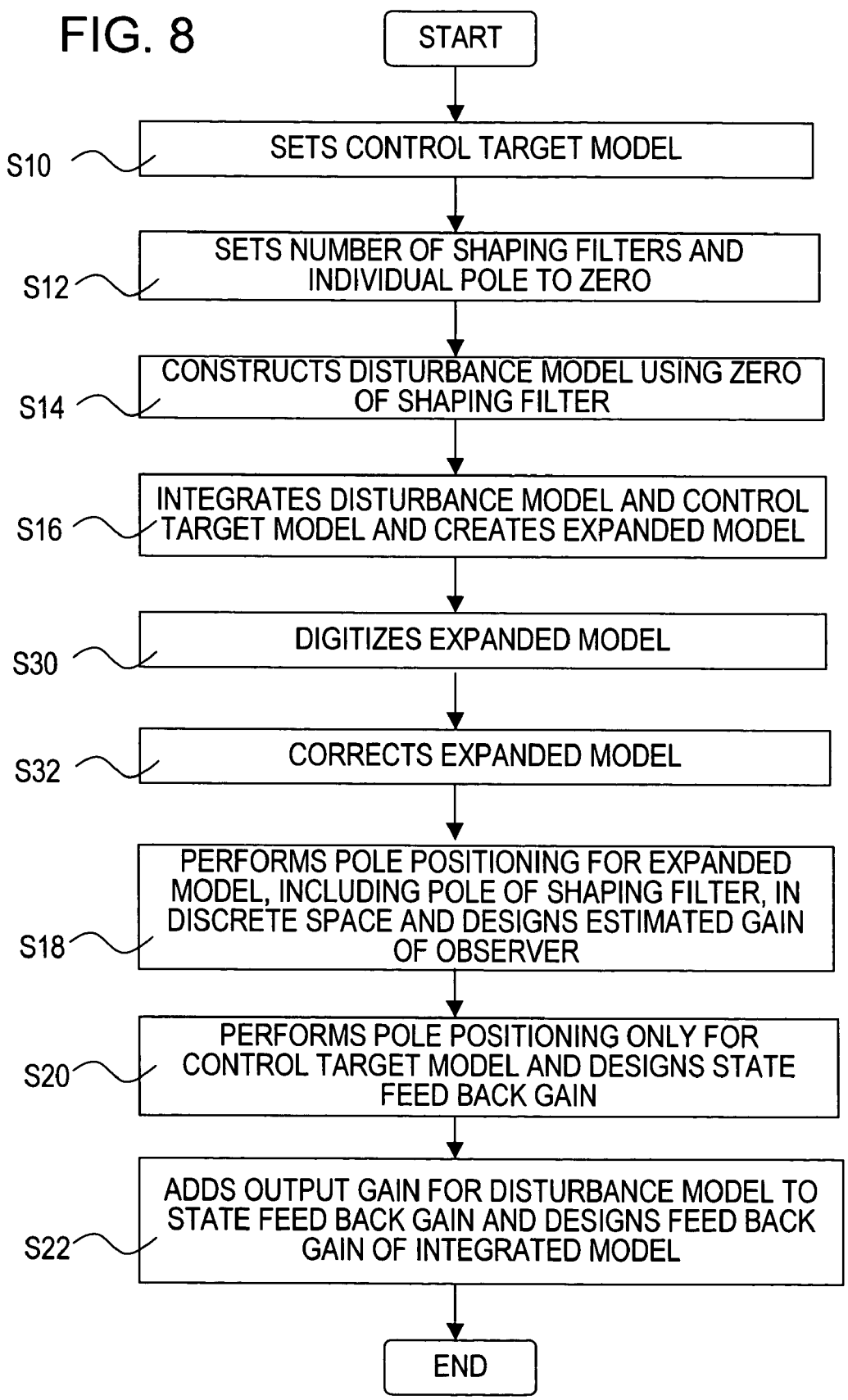
FIG. 8 is a flow chart depicting the digital design procedure of the disturbance observer in FIG. 6.

In FIG. 8, steps the same as those in FIG. 7 are denoted with the same reference symbols. As FIG. 8 shows, in step S16, the disturbance model is modeled in analog space, and an enlarged model is constructed. Then after the enlarged model is transformed (digitized) in the digital space in step S30, the pole assignment in step S18 is specified in the digital space.

In case that the disturbance model has the characteristic of the second degree filter, if the enlarged model is transformed into a discrete system, both of the two variables z1 and z2 of the disturbance model in matrix A for designing the estimation gain of the observer influence the actuator 1.

Therefore correction is made so that only one of the variables of the disturbance model influences the actuator 1, more specifically, so that only a variable, the same as that of analog design, influences the actuator 1. In other words, after digitizing, the enlarged model is corrected in step S32.

Specifically, when the analog model in the form of Expression (11), using the second degree filter, is digitized (that is by performing z transformation, the result is converted into SI units), the following Expression (14) is established.

$$z \begin{pmatrix} x[k] \\ v[k] \\ z1[k] \\ z2[k] \end{pmatrix} = \begin{pmatrix} 1 & T & A13 & A14 \\ 0 & 1 & A23 & A24 \\ 0 & 0 & A33 & A34 \\ 0 & 0 & A43 & A44 \end{pmatrix} \begin{pmatrix} x[k] \\ v[k] \\ z1[k] \\ z2[k] \end{pmatrix} + \frac{Bl}{m} \begin{pmatrix} T^2/2 \\ T \\ 0 \\ 0 \end{pmatrix} u[k]$$

$$y = (1 \; 0 \; 0 \; 0) \begin{pmatrix} x[k] \\ v[k] \\ z1[k] \\ z2[k] \end{pmatrix}$$

(14)

In Expression (14), 'z' is a z transformer and T is a sampling cycle. Here matrix A, that is A13, A14, A23 and A24, is focused on. Neither A14 nor A24 become "0" merely by digitizing. In other words, both of the two variables z1 and z2 of the disturbance model in matrix A for designing the estimated gain of the observer influence the actuator 1.

Therefore after digitizing the analog model, coefficients with which the state variables z1 and z2 of the disturbance model in matrix A influence the actuator 1 are replaced.

In the case of the example of Expression (14), matrix A is corrected as the following Expression (15).

$$\left. \begin{array}{l} A14 = A24 = 0 \\ A13 = T^2/2 \\ A23 = T \end{array} \right\}$$

(15)

In the digital control system, the unit of distance is a track, the current value is normalized with the maximum current as "1", and the velocity and acceleration are not in second units but must be normalized by a sampling frequency. In this way, if the observer in analog format in Expression (13) is transformed into the format of the current observer, the above mentioned Expressions (1), (2) and (3) are acquired, and the configuration in FIG. 6 is constructed.

In this way, the desired filter form for shaping can be constructed first, then the disturbance model is added to the observer in designing. Therefore for the observer, form can be freely shaped without being limited to the physical response characteristic of the original disturbance model.

Figure 9:
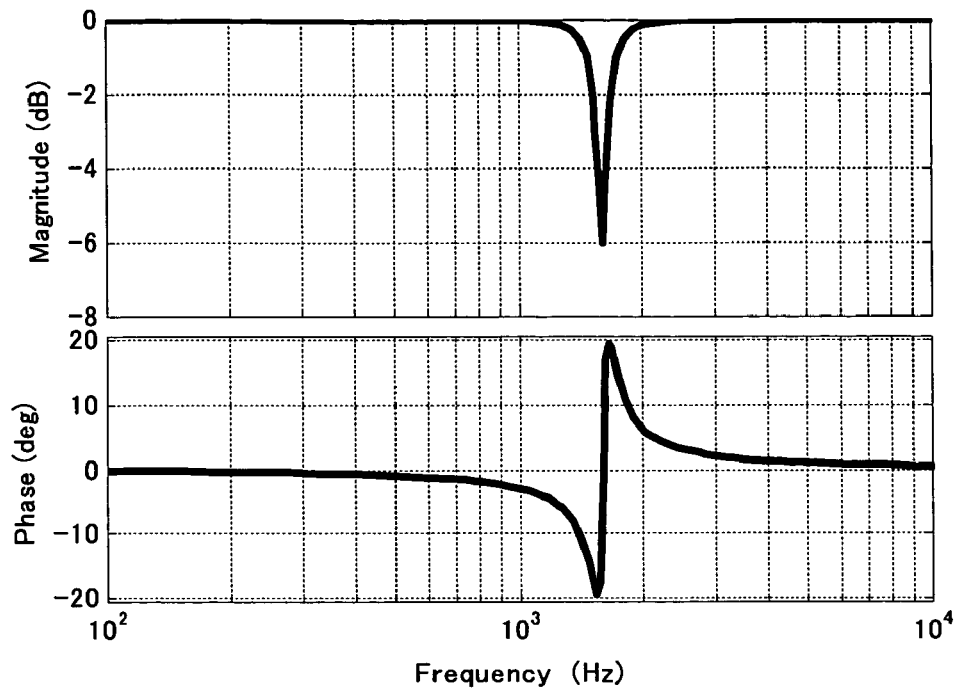
FIG. 9 is characteristic diagrams of the shaping filter according to the first example of the embodiment in FIG. 6.
Figure 10:
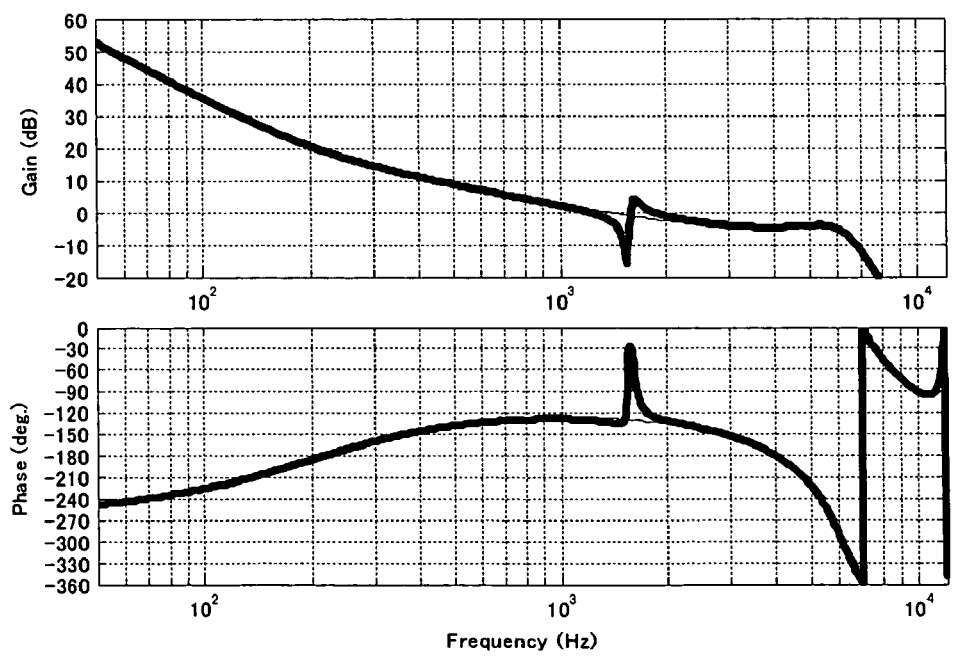
FIG. 10 is open loop characteristic diagrams according to the first example of the embodiment of FIG. 6.
Figure 11:
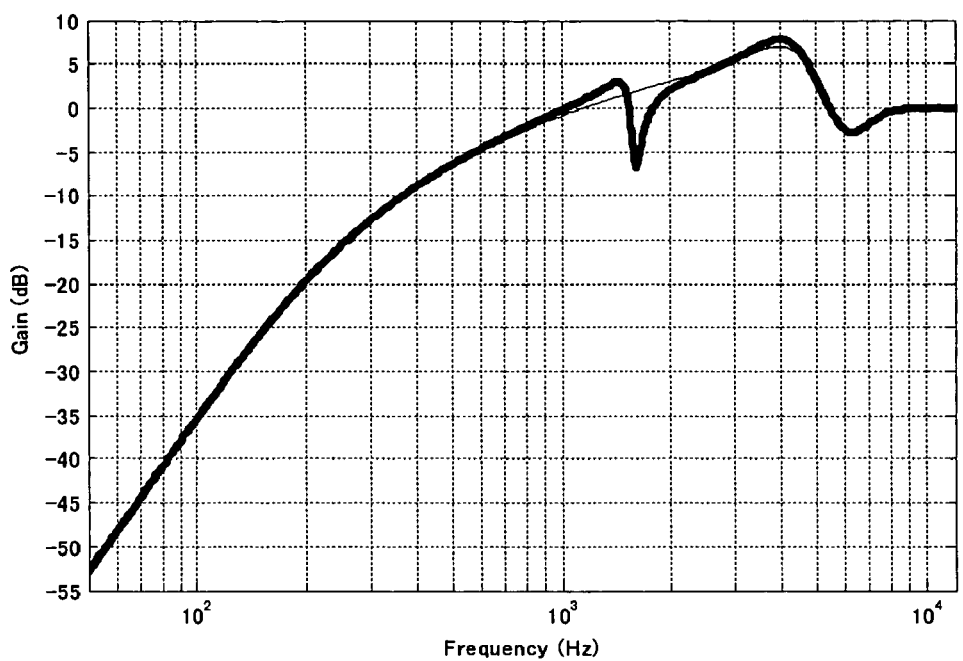
FIG. 11 is a characteristic diagram of the sensitivity function according to the first example of the embodiment in FIG. 6.
Figure 12:
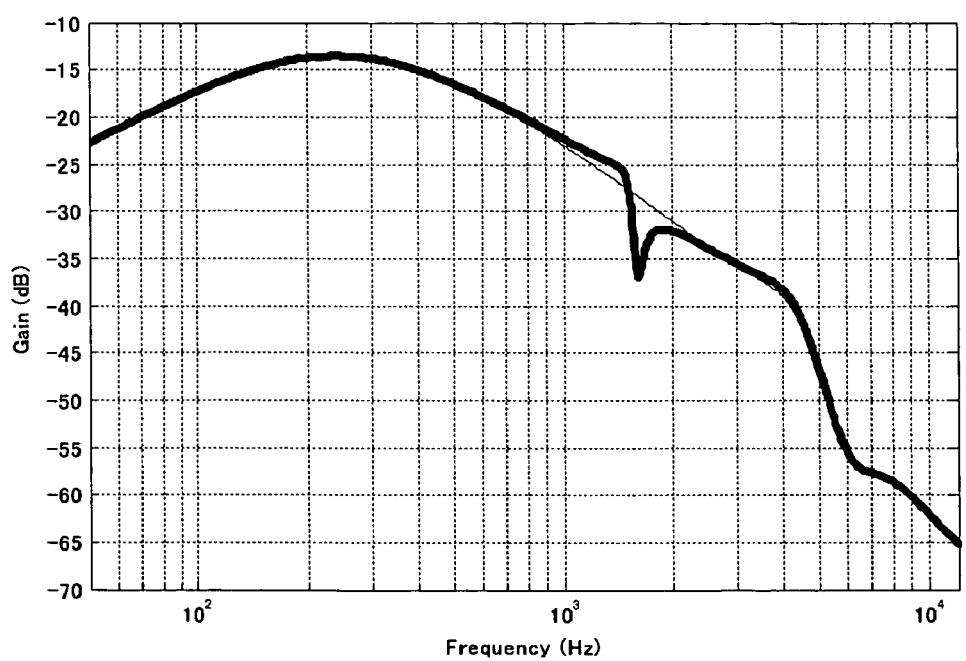
FIG. 12 is a characteristic diagram of the acceleration disturbance according to the first example of the embodiment in FIG. 6.

Now a concrete configuration example will be described. FIG. 9 to FIG. 12 are diagrams depicting the first embodiment of the present invention, where FIG. 9 are characteristic diagrams of the shaping filter, FIG. 10 are open loop characteristic diagrams, FIG. 11 is a characteristic diagram of the sensitivity function, and FIG. 12 is a characteristic diagram of acceleration disturbance.

FIG. 9 to FIG. 12 show an example when 1600 Hz is suppressed in a notch form. Suppressing high frequency like this is required when high frequency is applied due to the vibration of the disk medium or vibration of the head suspension. Particularly if the rotation frequency of the disk medium increases, this kind of influence due to high frequency disturbance, is conspicuous in the case of a device of which track density is high.

In this high frequency area, it is difficult to implement disturbance suppression even if the reverse characteristic of the notch filter is inserted into the controller in series. Also as the phase characteristic shows, trial and error is required for adjusting the filter coefficient in order to implement the characteristic of dropping then raising the phase.

In the present embodiment, the shaping filter for suppressing only a specific frequency is designed as shown in FIG. 9. This shaping filter is designed using the second degree filter shown in Expression (8). FIG. 9 shows in Expression (8), $\omega 1 = 2\pi * 1600$, $\omega 2 = \omega 1$, $\zeta 1 = 0.025$ and $\zeta 2 = 0.05$.

As for the frequency characteristic of this shaping filter, the gain is suppressed at around 1600 Hz, and the phase drops once at around 1600 Hz and then rises, as shown in the frequency vs. gain characteristic at the top and the frequency vs. phase characteristic at the bottom in FIG. 9.

Using the shaping filter designed like this, the above mentioned observer is constructed. As for the open loop characteristic of the control system comprised of this observer, the gain is dropped at 1600 Hz, and the phase is raised at around 1600 Hz, as shown in the frequency vs. gain characteristic at the top and the frequency vs. phase characteristic at the bottom in FIG. 10.

Therefore as for the sensitivity function of the control system, the gain is suppressed at around 1600 Hz, as shown in the frequency vs. gain characteristic in FIG. 11. As for the acceleration disturbance characteristic of the control system, the gain is suppressed at around 1600 Hz, as shown in the frequency vs. gain characteristic in FIG. 12.

Figure 13:
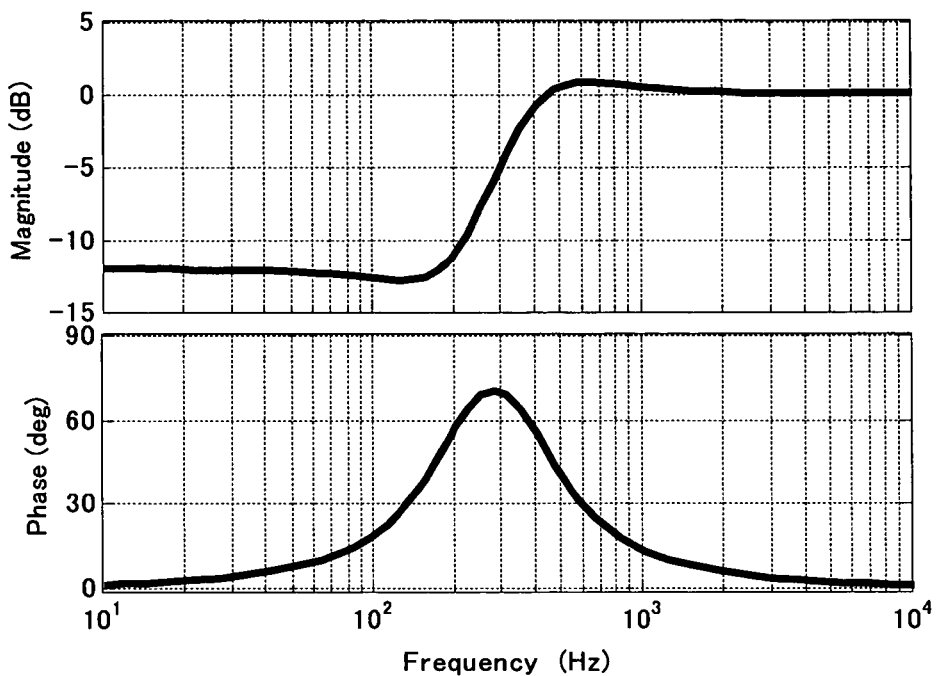
FIG. 13 is characteristic diagrams of a shaping filter according to the second example of the embodiment in FIG. 6.
Figure 14:
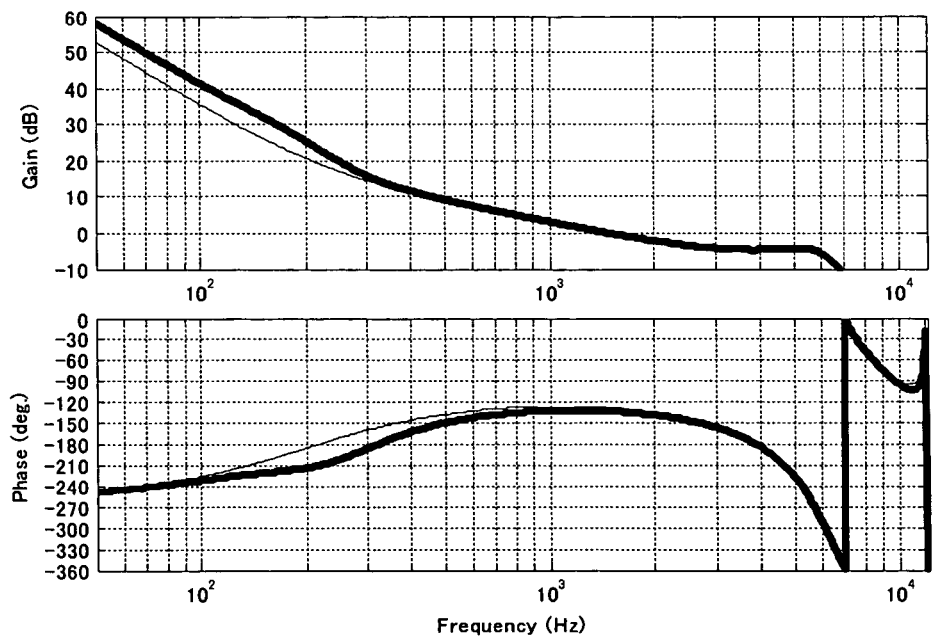
FIG. 14 is open loop characteristic diagrams according to the second example of the embodiment in FIG. 6.
Figure 15:
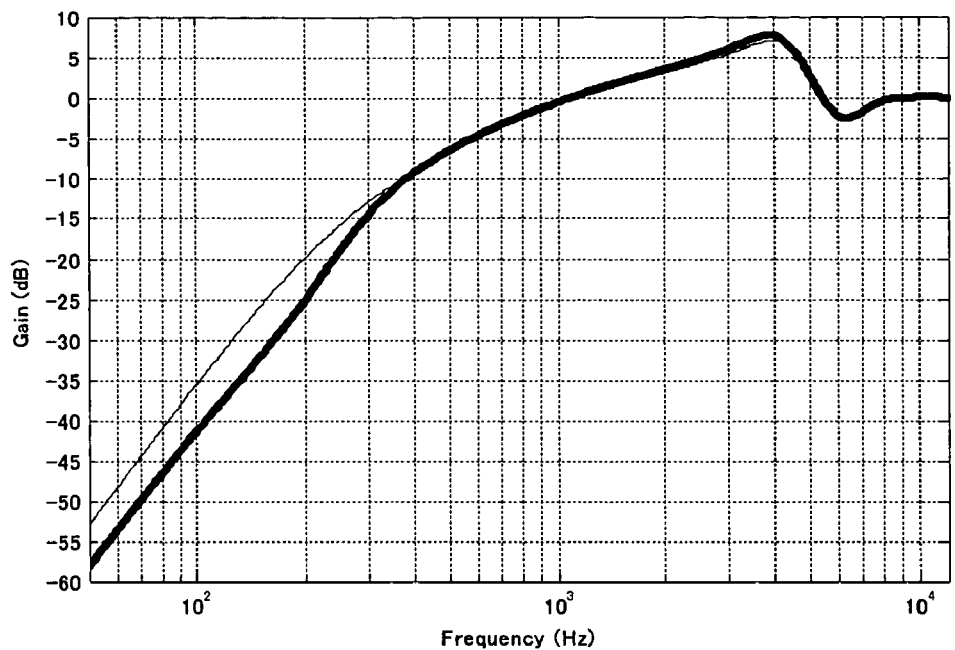
FIG. 15 is a characteristic diagram of the sensitivity function according to the second example of the embodiment in FIG. 6.
Figure 16:
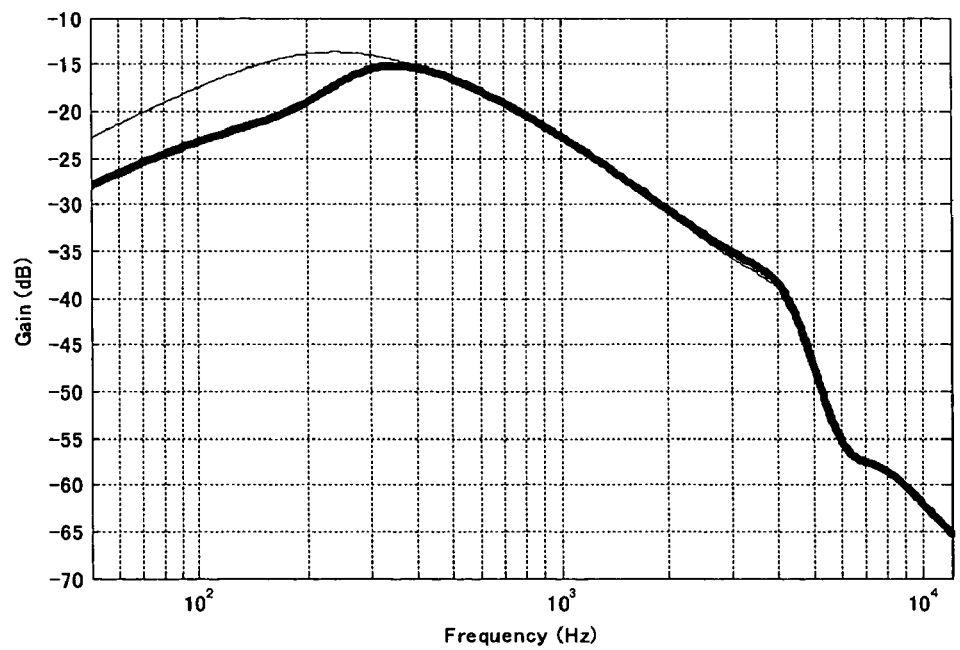
FIG. 16 is a characteristic diagram of the acceleration disturbance according to the second example of the embodiment in FIG. 6.

FIG. 13 to FIG. 16 are diagrams depicting the second embodiment of the present invention, where FIG. 13 are characteristic diagrams of the shaping filter, FIG. 14 are open loop characteristic diagrams, FIG. 15 is a characteristic diagram of the sensitivity function, and FIG. 16 is a characteristic diagram of acceleration disturbance.

FIG. 13 to FIG. 16 are an example when the low frequency area is uniformly suppressed. Uniformly suppressing low frequency area like this is required when wind pressure at the inner side and outer side of the disk medium has an influence, in addition to the eccentricity of the disk medium. In particular, many external vibration components in low frequency area exist, and the influence thereof is conspicuous. It is difficult to widen the suppression width in the low frequency area in the case of a conventional observer.

In the present embodiment, the shaping filter for suppressing low frequency in a wide range is designed, as shown in FIG. 13. This shaping filter is designed using the second degree filter shown in Expression (8). FIG. 13 shows in Expression (8), $\omega 1 = 2\pi * 200$, $\omega 2 = 2\pi * 400$, $\zeta 1 = 0.5$ and $\Lambda 2 = 0.5$.

As for the frequency characteristics of this shaping filter, the gain gradually increases after the lower limit (100 Hz) in the low frequency area, becoming roughly constant at the upper limit (around 500 Hz in this case) in the low frequency area, and the phase forms a peak between the lower limit (100 Hz) in the low frequency area and the upper limit (around 500

Hz in this case) in the low frequency area, as shown in the frequency vs. gain characteristic at the top and the frequency vs. phase characteristic at the bottom in FIG. 13.

Using the shaping filter designed like this, the above mentioned observer is constructed. As for the open loop characteristic of the control system comprised of this observer, the gain is raised in the low frequency area, and the phase is raised around the low frequency area, as shown with the thick lines in the frequency vs. gain characteristic at the top and the frequency vs. phase characteristic at the bottom in FIG. 14.

Therefore as for the sensitivity function of the control system, the gain is suppressed at around the low frequency area, as shown with the thick line in the frequency vs. gain characteristic in FIG. 15. As for the acceleration disturbance characteristic of the control system, the gain is suppressed in the low frequency area, as shown with the thick line in the frequency vs. gain characteristic in FIG. 16.

As this embodiment shows, suppression of the high frequency and the disturbance suppression observer with a wide low frequency area width, which are difficult with prior arts, can easily be implemented.

Description of Table of First Embodiment

Figure 17:
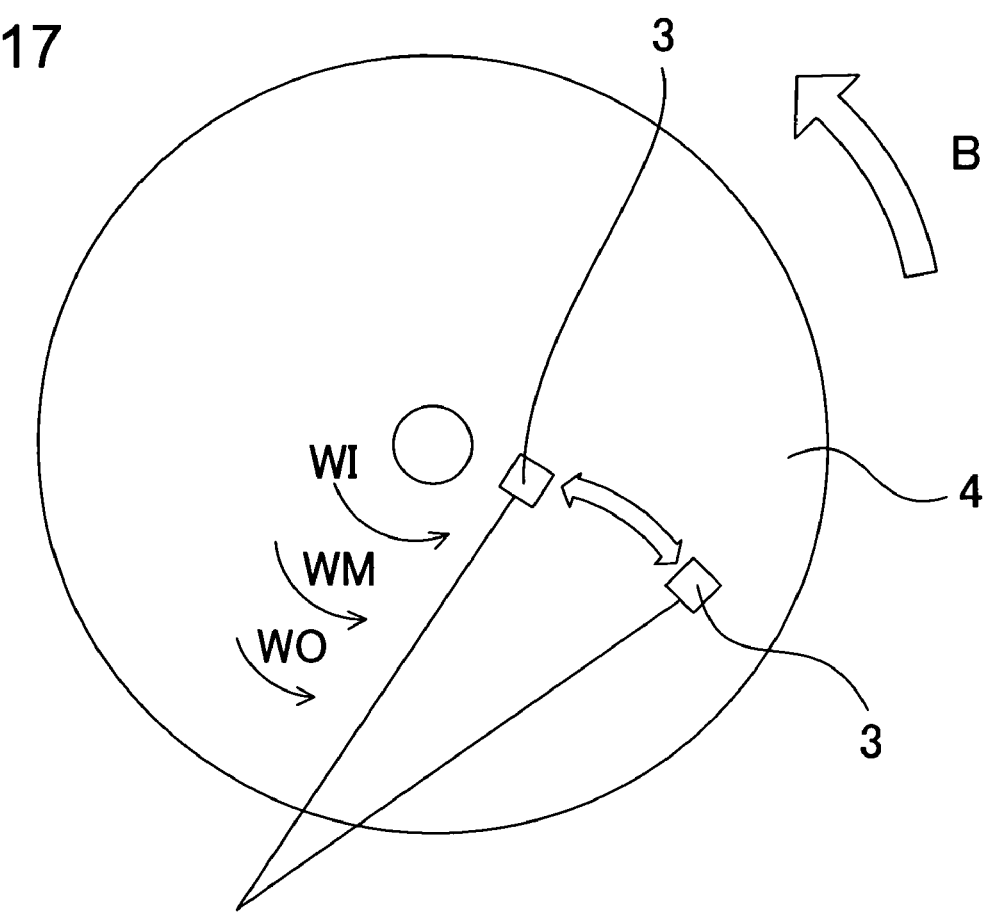
FIG. 17 is a diagram depicting the change of the disturbance suppression frequency characteristic of the embodiment in FIG. 6.
Figure 18:
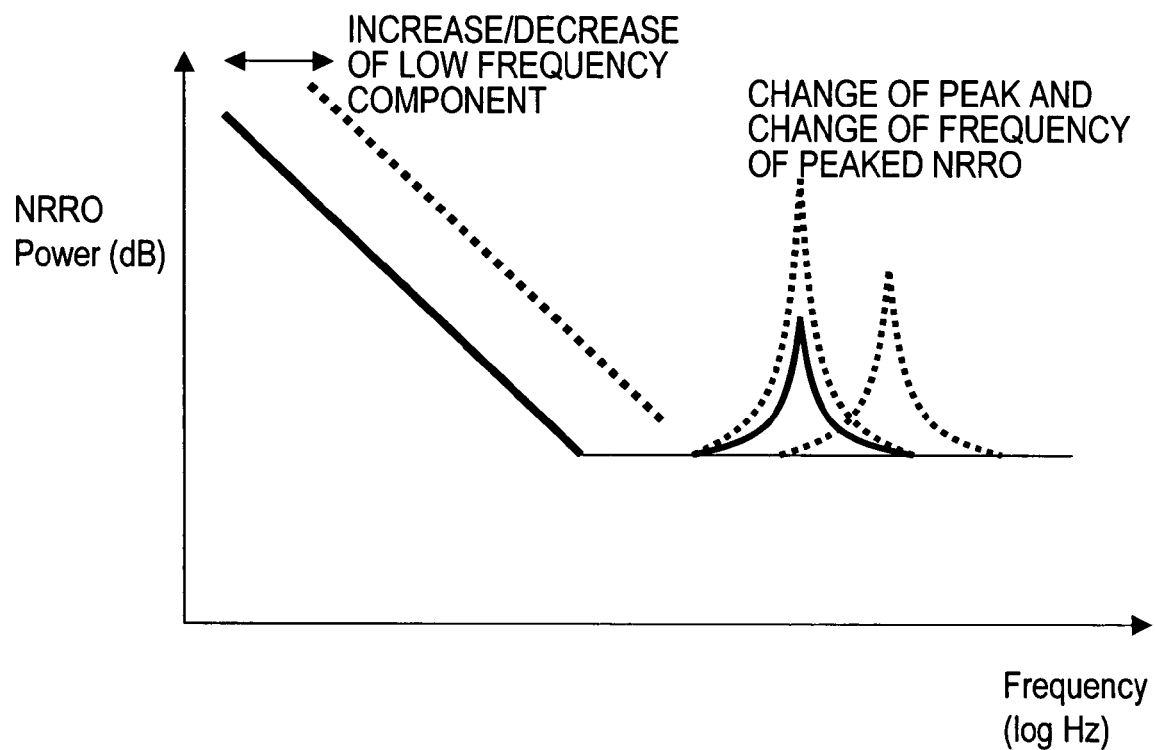
FIG. 18 is a diagram depicting the NRRO characteristic in FIG. 17.

FIG. 17 is a diagram depicting an embodiment of the present invention, and FIG. 18 is a diagram depicting the relationship between the frequency and NRRO power thereof. As FIG. 17 shows, with respect to a disk 4 which rotates in an arrow B direction, a head 3 is moved in the radius direction of the disk 4 by an actuator. The disk 4 generates wind by the rotation thereof, and the wind influences the head 3 as a disturbance. In other words, the wind pressure WI at the inner side and wind pressure WO at the outer side of the disk 4 differ, and wind disturbances increases/decreases depending on the position of the head. When the head 3 positions at the inner side of the disk 4, the influence of the wind that the actuator 1 receives increases. This appears in low frequency components.

The suspension supporting the head 3 and the disk 4 are vibrating. This vibration is observed as a positional error, and appears as NRRO which does not synchronize with the rotation frequency, and the characteristic thereof differs depending on each head.

FIG. 18 shows the general state of the NRRO. As FIG. 18 shows, the power of NRRO depends on the wind disturbance, and is higher in NRRO at the inner side (dotted line) than in NRRO at the outer side (solid line) in the low frequency area.

Also as FIG. 18 shows, the vibrations of the suspension and the disk 4 also change depending on each head. In other words, these vibrations appear as a change of the peak of the peaked NRRO and the change of frequency, and the dotted line indicates the first head and the solid line indicates the second head.

To handle these problems, the present invention optimizes the frequency characteristic of the controller, and suppresses the changed disturbance according to the head number and track position (that is target position). For this, a table 22 for storing the frequency characteristic parameters of the controller is created, and the frequency characteristic of the controller is changed according to the target position.

Figure 20:
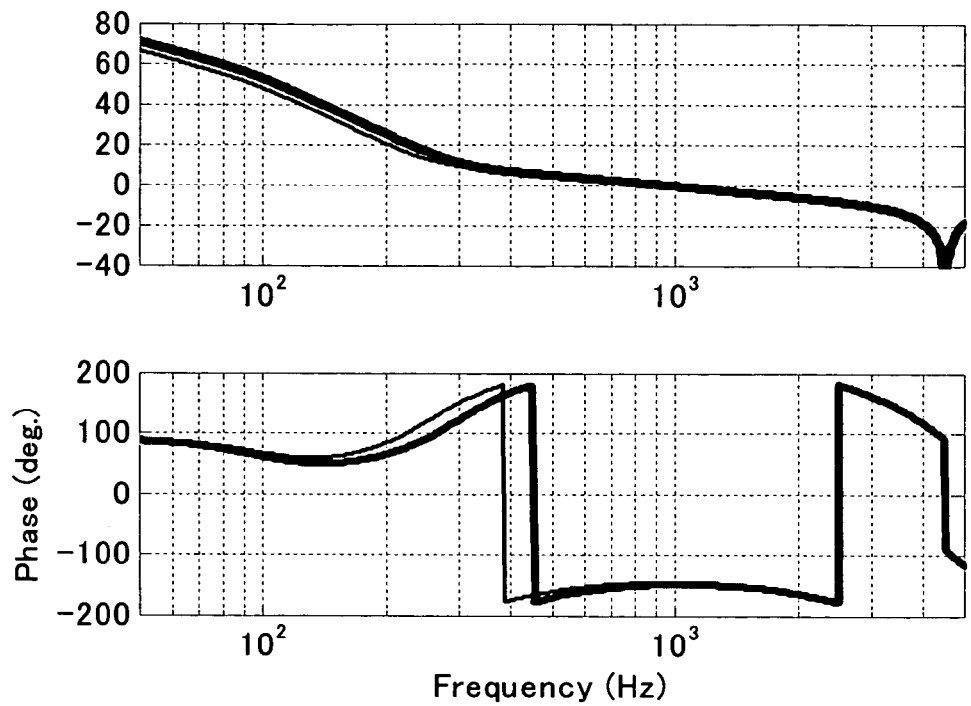
FIG. 20 is open loop characteristic diagrams according to the table in FIG. 19.
Figure 21:
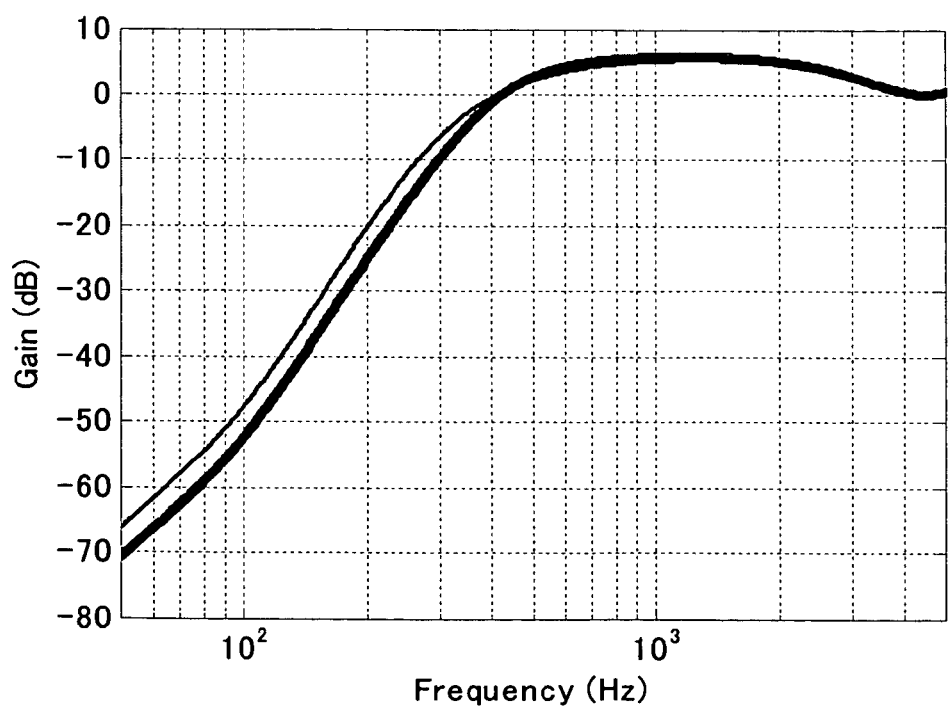
FIG. 21 is a characteristic diagram of the sensitivity function of the embodiment in FIG. 19.

FIG. 19 shows a configuration example of the table 22 for suppressing the wind disturbance of the low frequency area according to the position, FIG. 20 are open loop characteristic diagrams thereof, and FIG. 21 is a characteristic diagram of the sensitivity function thereof.

For example, when the NRRO power is higher at the inner side than the outer side, as shown in the example of suppressing the wind disturbance in the low frequency area in FIG. 18, the low frequency gain at the inner side of the NRRO is dropped more than the low frequency gain at the outer side. First the second degree model in Expression (8) is used as the shaping filter. And the parameters of Expression (8) are set as follows, regarding the model at the outer side as Model 1 and the model at the inner side as Model 2.

$\zeta 1=\zeta 2=0.5, \omega 1=2\pi \cdot 100, \omega 2=2\pi \cdot 300$        Model 1

$\zeta 1=\zeta 2=0.5, \omega 1=2\pi \cdot 100, \omega 2=2\pi \cdot 400$        Model 2

The contents of the table 22 in this case are shown in FIG. 19. Here the numerator of Expression (8) is the same for Model 1 and Model 2, which is ($\zeta 1, \omega 1$)), so matrix A matches and gain F is also the same, but the estimated gain L is different between the inner side and outer side. In other words, matrix A and F are common, and only L has a different value, so the increase/decrease of the low frequency gain in FIG. 18 can be handled.

FIG. 20 and FIG. 21 show the open loop characteristic and sensitivity function based on this estimated gain L. In FIG. 20 and FIG. 21, the thin line indicates Model 1 (outer side), and the thick line indicates Model 2 (inner side).

More specifically, the above mentioned observer is constructed using the above mentioned shaping filter. The open loop characteristic of the control system constructed by the observer in this case is shown as the frequency vs. gain characteristic diagram at the top and the frequency vs. phase characteristic diagram at the bottom in FIG. 20, just like FIG. 14. In the open loop characteristic, gain in the low frequency area is larger in the thick line of Model 2 than the thin line of Model 1.

Therefore as for the sensitivity function of the control system, gain in the low frequency area is suppressed more in the inner side than in the outer side, as the thick line (Model 2: inner side) and thin line (Model 1: outer side) of the frequency vs. gain characteristic in FIG. 21 shows, just like FIG. 15.

Therefore as FIG. 19 shows, the estimated gains of the inner and outer sides are stored in the table 22, the table 22 is referred to by the target position 'r', and the corresponding gain is set in the observer depending on whether the target position 'r' is inner or outer, so that the frequency characteristic in FIG. 20 and FIG. 21 for suppressing the wind disturbance in the low frequency area in FIG. 18 can be set in the observer.

Now an example of preventing vibration of the head in the high frequency area will be described. As shown in FIG. 18, when the frequencies of the first head and second head, with respect to the NRRO, are different from each other, the suppression frequency is changed between the first head and second head. First the second degree model in Expression (8) is used as the shaping filter. And the parameters in Expression (8) are set as follows, regarding the model of the first head as Model 1, and the model of the second head as Model 2.

$\zeta 1=0.01, \zeta 2=0.1, \omega 1=2\pi \cdot 1500, \omega 2=2\pi \cdot 1500$        Model 1

$\zeta 1=0.015, \zeta 2=0.15, \omega 1=2\pi \cdot 1200, \omega 2=2\pi \cdot 1200$        Model 2

The contents of the table 22 in this case are shown in FIG. 22. Here different suppression frequencies are set, which are the suppression frequency of Model 1 (first head) as 1500 Hz, and the suppression frequency of Model 2 (second head) as 1200 Hz, so gain F is common, but the estimated gain L and Matrix A are different between the first head and the second head. In other words, F is common, and matrix A and the value of the estimated gain L are different, so the change of frequency in the high frequency area in FIG. 18 can be handled.

Figure 23:
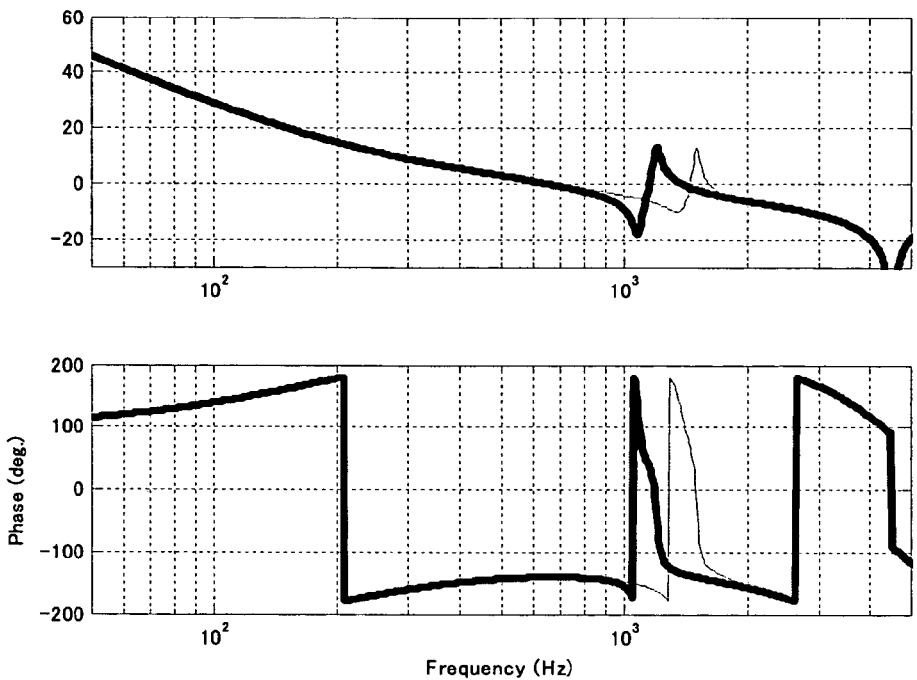
FIG. 23 is open loop characteristic diagrams according to the table in FIG. 22.
Figure 24:
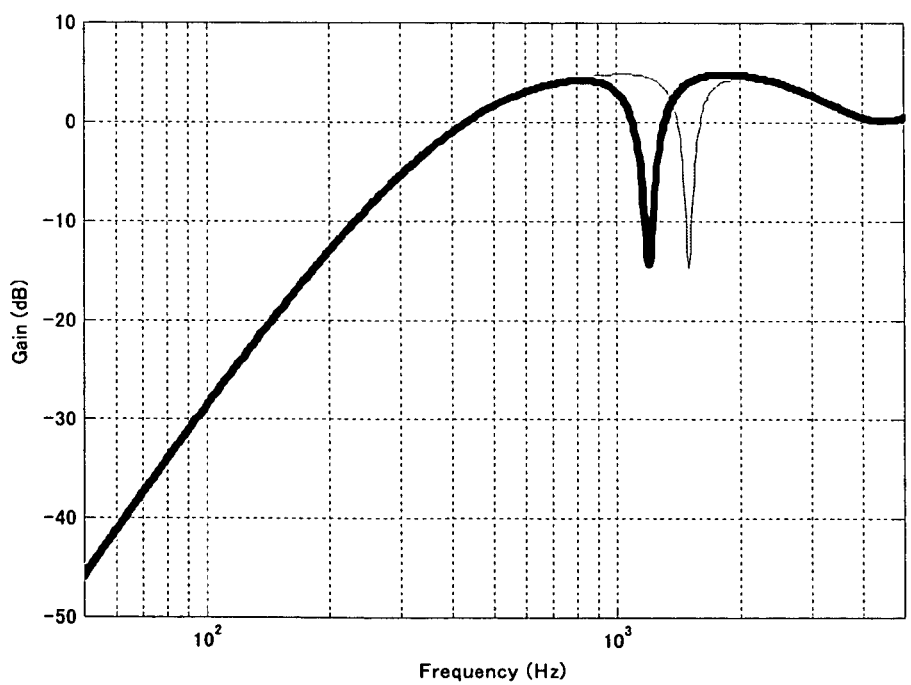
FIG. 24 is a characteristic diagram of the sensitivity function of the embodiment in FIG. 22.

FIG. 23 and FIG. 24 show the open loop characteristic and sensitivity function based on this estimated gain L and matrix A. In FIG. 23 and FIG. 24, the thin line indicates Model 1 (first head) and the thick line indicates Model 2 (second head).

More specifically, the above mentioned observer is constructed using the above mentioned shaping filter. The open loop characteristic of the control system constructed by the observer in this case is shown as the frequency vs. gain characteristic diagram at the top and the frequency vs. phase characteristic diagram at the bottom in FIG. 23, just like FIG. 14. In the open loop characteristic, the peak of the suppression frequency is lower in the thick line of Model 2 (second head) than the thin line of Model 1 (first head).

Therefore as for the sensitivity function of the control system, the suppression frequency is lower in the second head than the first head, and the second head is suppressed at the lower frequency, as the thick line (Model 2: second head) and the thin line (Model 1: first head) of the frequency vs. gain characteristic in FIG. 23 show, just like FIG. 15.

Therefore as FIG. 22 shows, the estimated gain L and matrix A of the first head and second head are stored in the table 22, the table 22 is referred to by the target position 'r' (head number in this case), and the corresponding gain L and matrix A are set in the observer depending on whether the target position (head number) 'r' is the first head or second head, so that the frequency characteristics in FIG. 23 and FIG. 24 for suppressing the peak frequency of a different NRRO in the high frequency area shown in FIG. 18 can be set in the observer.

Second Embodiment of Position Control System

Figure 25:
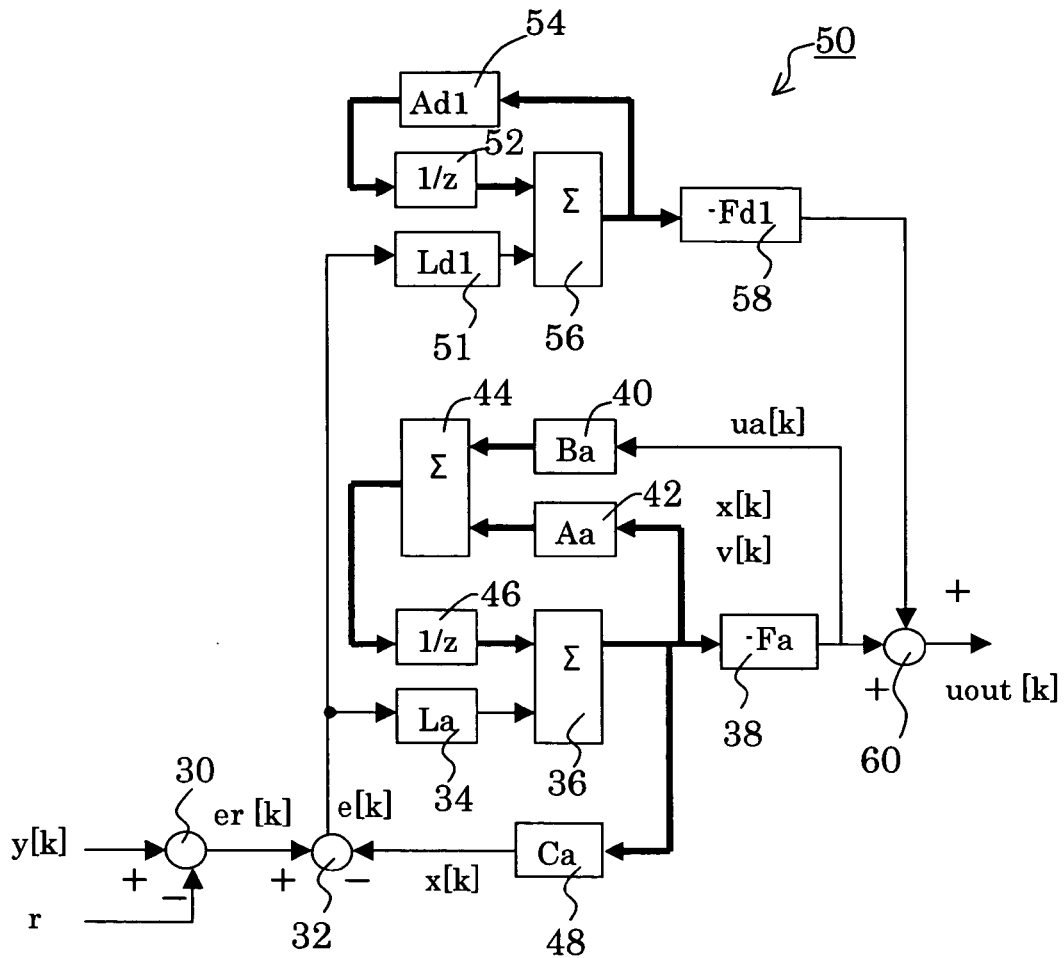
FIG. 25 is a block diagram depicting a position control system according to the second embodiment of the present invention.
Figure 26:
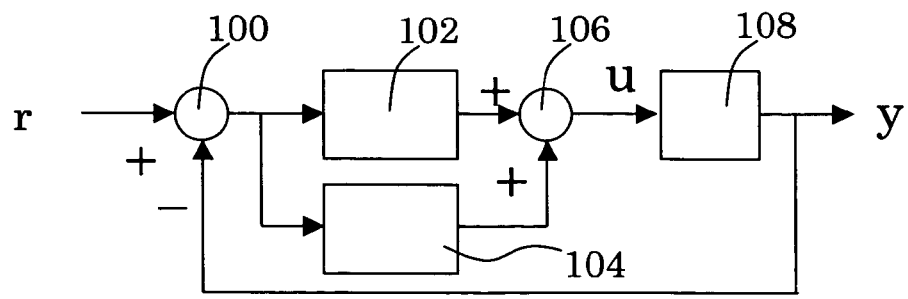
FIG. 26 is a block diagram depicting a first prior art.
Figure 27:
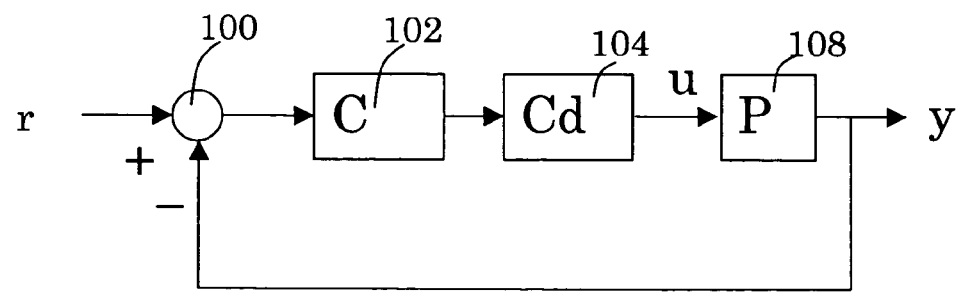
FIG. 27 is a block diagram depicting a second prior art.
Figure 28:
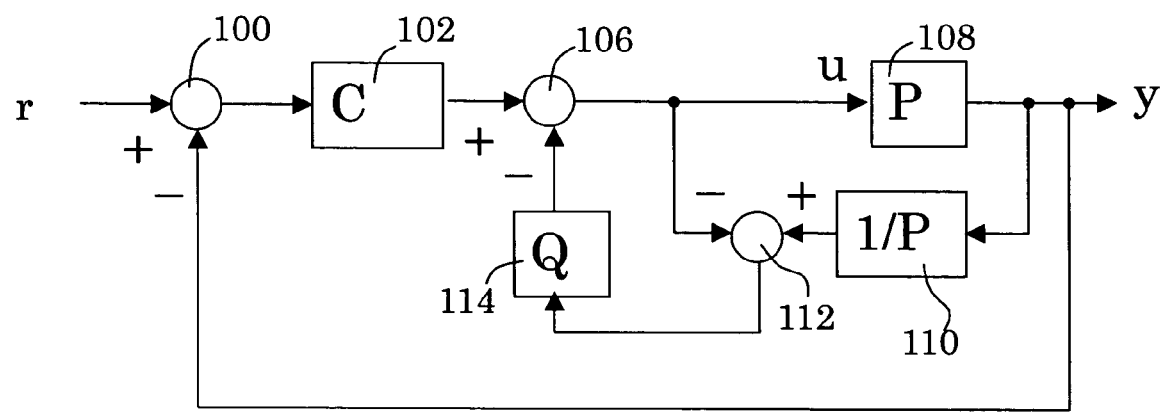
FIG. 28 is a block diagram depicting a third prior art.

FIG. 25 is a block diagram depicting the second embodiment of the position control system for suppressing disturbance, which is executed by the MCU 14 in FIG. 1. This position control system is an observer control system for suppressing disturbance by adaptive control, and is an adaptive control system where the disturbance model in FIG. 6 is set up separately from the controller.

In FIG. 25, the same composing elements as these in FIG. 6 are denoted with the same reference symbols. This observer is the case when the disturbance model is designed to be separable, and Expressions (1), (2) and (3) are transformed and expressed as the following Expressions (16), (17), (18), (19) and (20).

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix} (y(k) - x(k)) \quad (16)$$

$$u(k) = -(F1 \quad F2) \begin{pmatrix} x(k) \\ v(k) \end{pmatrix} \quad (17)$$

$$uout(k) = u(k) - (F3 \quad F4 \quad F5) \begin{pmatrix} b(k) \\ z1(k) \\ z2(k) \end{pmatrix} \quad (18)$$

$$\begin{pmatrix} x(k+1) \\ v(k+1) \end{pmatrix} = \begin{pmatrix} 1 & 1 \\ 0 & 1 \end{pmatrix} \begin{pmatrix} x(k) \\ v(k) \end{pmatrix} + \frac{Bl}{m} \frac{1}{Lp} T^2 \begin{pmatrix} 1/2 \\ 1 \end{pmatrix} u(k) \quad (19)$$

$$b(k+1) = b(k) \quad (20)$$

$$\begin{pmatrix} z1(k+1) \\ z2(k+1) \end{pmatrix} = \begin{pmatrix} a11 & a12 \\ a21 & a22 \end{pmatrix} \begin{pmatrix} z1(k) \\ z2(k) \end{pmatrix}$$

In other words, in comparison of Expression (16) to Expression (20) and Expression (1) to Expression (3), Expression (19) is the model of the controller in Expression (3) which is expressed independently, and Expression (20) is an expression when the disturbance model 50 is separated. Expression (16) and Expression (1) are the same, but Expression (19) and Expression (20) are separated, so the output expression of Expression (3) is separated into Expression (17) and Expression (18).

As shown in FIG. 25, the present embodiment is an example of an adaptive control system where the disturbance model 50 is separated from the model of the controller. In FIG. 25, the first computing block 30 computes the actual position error er[k] by subtracting the target position 'r' from the observation position y[k] which is acquired by demodulating the servo information read by the head 3. The second computing block 32 computes the estimated position error e[k] by subtracting the estimated position x[k] of the observer from the actual position error er[k].

In the controller model, this estimated position error e[k] is input to the state estimation block 34, and the estimated correction value (right hand side of Expression (16)) is computed using the estimated gain La (L1 and L2) of the controller. And the result is added with the state quantities (left hand side of Expression (16)) x[k] and v[k] from the delay block 46 in the addition block 36, and the estimated position x[k] and estimated velocity v[k] are acquired, as shown in Expression (16). In Expression (16), the estimated position error e[k] is indicated by (y[k]−x[k]).

The estimated values x[k] and v[k] are multiplied by a state feedback gain (−Fa=F1, F2) in the fourth computing block 38, and the first drive value u[k] of the actuator 1 is acquired, as shown in Expression (17). On the other hand, the estimated values x[k] and v[k] of Expression (1) from the addition block 36 are multiplied by the estimated gain Aa (2×2 matrix (1, 0) in Expression (19)) in the fifth computing block 42, and the drive value u[k] in the fourth computing block 38 is multiplied by the estimated gain Ba (value by which u[k] in Expression (19) is multiplied) in the sixth computing block 40. Both of the multiplication results are added in the addition block 44, and the estimated state quantities x[k+1] and v[k+1] of the next sample in Expression (19) are acquired.

The estimated state quantity of the next sample is input to the delay block 46, as mentioned above, and is corrected with the estimated correction value in the state estimation block 34. And for the estimated value of Expression (16) from the addition block 36, the estimated position x[k] is acquired in the seventh computing block 48, and is input to the second computing block 32.

In the disturbance model 50, on the other hand, the estimated position error e[k] is input to the state estimation block 51 of the disturbance, and the estimated correction value (right hand side of Expression (16)) is computed using the estimated gain Ld1 (L3, L4 and L5). And the result is added with the state quantity (left hand side of Expression (16)) from the delay block 52 in the addition block 56, and the estimated bias value b[k] and estimated disturbance suppression values z1[k] and z2[k] are acquired, as shown in Expression (16).

The estimated values b[k], z1[k] and z2[k] are multiplied by the state feedback gain (Fd1=F3, F4, F5) in the eighth computing block 58, and the disturbance suppression drive value of the actuator 1 is acquired, as shown in Expression (18). The estimated values b[k], z1[k] and z2[k] of Expression (16) from the addition block 56, on the other hand, are multiplied by the estimated gain Ad1 (gain of b[k] and gain of 2×2 matrix A of Expression (20)) in the ninth computing block 54, and are input to the delay block 52, and the estimated values b[k+1], z1[k+1] and z2[k+1] of the next sample are acquired.

And in the addition block 60, the disturbance suppression drive value is subtracted from the drive value u[k], and the output drive value uout[k] of Expression (18) is acquired.

In other words, the estimated gain L is separated between the controller model and disturbance model, and the feedback gain F is separated between the controller model and disturbance model, so as to design the controller model and disturbance model separately.

In this example as well, each disturbance model is designed with the shaping filter, as shown in FIG. 6 to FIG. 24. In the same manner, an enlarged model is designed, and also in the same manner, by the table 22, the estimated gain L, matrix A and feedback gain are changed according to the head position, and frequency characteristic is optimized according to the position.

Other Embodiments

In the above embodiments, the disturbance observer control was described using an example of the head positioning device of a magnetic disk device, but the present invention can also be applied to other disk devices, such as an optical disk device. In the case of the example in FIG. 19, the position was classified in an inner and outer, but the disturbance suppression frequency characteristic may be set in the table 22 classifying the position into three or more areas zones in the radius direction of the disk.

Also in the example in FIG. 22, an example of mounting two heads on one device was described, but if three or more heads are mounted, the disturbance suppression frequency characteristic of each head may be set in the table 22. The table in FIG. 22 and the one in FIG. 19 may be combined.

Also the number of disturbance frequencies can be arbitrary according to necessity, and the number of disturbance models can be arbitrary accordingly. Embodiments were described using a second degree filter, but a first degree filter or a combination of a first degree filter and a second degree filter may be used according to the frequency which need be suppressed.

The present invention was described using embodiments, but the present invention can be modified in various ways within the scope of the essential character thereof, and these variant forms shall not be excluded from the scope of the present invention.

Since the disturbance suppression frequency characteristic is changed by changing an estimated gain of an observer having a disturbance suppression function according to the position of the head, the disturbance suppression characteristic can be optimized according to the position of the head in the radius direction and between disks, and the vibration of the head can be prevented even if recording density is increased, therefore positioning accuracy can be improved.

What is claimed is:

1. A head position control method for controlling a position of a head in a predetermined position of a disk storage medium by an actuator, comprising:
   a step of computing a position error from a target position of the head and a current position acquired from the head;
   a step of computing an estimated position error between the position error and an estimated position of an observer;
   a step of creating state information using an estimated gain of the observer according to the estimated position error, and computing a control value of the actuator from the state information; and
   a step of changing disturbance suppression frequency by acquiring an estimated gain of a controller and an estimated gain of a disturbance model corresponding to a target position of the head from a table and setting the estimated gains in the observer.

2. The head position control method according to claim 1, wherein the change step comprises a step of changing the suppression frequency characteristic of NRRO (Non Repeatable Run Out) disturbance.

3. A head position control method for controlling a position of a head in a predetermined position of a disk storage medium by an actuator, comprising:
   a step of computing a position error from a target position of the head and a current position acquired from the head;
   a step of computing an estimated position error between the position error and an estimated position of an observer;
   a step of creating state information using an estimated gain of the observer according to the estimated position error, and computing a control value of the actuator from the state information;
   a step of changing disturbance suppression frequency by acquiring an estimated gain corresponding to a target position of the head from a table and setting the estimated gain in the observer,
   wherein the change step comprises a step of changing the suppression frequency characteristic of NRRO (Non Repeatable Run Out) disturbance, and
   wherein the change step comprises a step of acquiring an estimated gain corresponding to the position of the head on the disk in the radius direction from a table, and changing suppression frequency characteristic of wind disturbance of the observer.

4. A head position control method for controlling a position of a head in a predetermined position of a disk storage medium by an actuator, comprising:
   a step of computing a position error from a target position of the head and a current position acquired from the head;
   a step of computing an estimated position error between the position error and an estimated position of an observer;
   a step of creating state information using an estimated gain of the observer according to the estimated position error, and computing a control value of the actuator from the state information;
   a step of changing disturbance suppression frequency by acquiring an estimated gain corresponding to a target position of the head from a table and setting the estimated gain in the observer,
   wherein the change step comprises a step of changing the suppression frequency characteristic of NRRO (Non Repeatable Run Out) disturbance, and
   wherein the change step comprises a step of acquiring an estimated gain corresponding to a head number which indicates a position of the disk face corresponding to said head, and changing a peak of the suppression frequency of the observer.

5. A head position control method for controlling a position of a head in a predetermined position of a disk storage medium by an actuator, comprising:
   a step of computing a position error from a target position of the head and a current position acquired from the head;

a step of computing an estimated position error between the position error and an estimated position of an observer;

a step of creating state information using an estimated gain of the observer according to the estimated position error, and computing a control value of the actuator from the state information;

a step of changing disturbance suppression frequency by acquiring an estimated gain corresponding to a target position of the head from a table and setting the estimated gain in the observer, wherein the step of computing the control value comprises:

a step of creating state information using an estimated gain of a controller and an estimated gain of a disturbance model defined by a transfer function for which a denominator is a numerator of a filter, of which degrees of a denominator and the numerator are the same, for shaping a sensitivity function, and a step of computing the control value including a disturbance suppression value of the actuator from the state information.

6. The head position control method according to claim 5, wherein the step of computing the control value comprises:

a step of creating state information using an estimated gain of the controller according to the estimated position error and computing a control value of the actuator from the state information;

a step of creating state information using an estimated gain of a disturbance model defined by a transfer function for which a denominator is a numerator of a filter, of which degrees of a denominator and the numerator are the same, for shaping a sensitivity function according to the estimated position error, and computing a disturbance suppression value of the actuator from the state information; and a step of adding the control value and the disturbance suppression value to compute a drive value of the actuator.

7. The head position control method according to claim 6, wherein the step of computing the disturbance suppression value comprises:

a step of creating state information using an estimated gain of a disturbance model having a zero point of the numerator of the filter for shaping the sensitivity function according to a desired disturbance frequency as a pole; and a step of computing the disturbance suppression value of the actuator from the state information.

8. The head position control method according to claim 6, wherein the step of computing the disturbance suppression value comprises:

a step of creating state information using an estimated gain of a disturbance model for which a denominator is the numerator of the first degree or second degree filter for shaping a sensitivity function according to a desired disturbance frequency; and a step of computing the disturbance suppression value of the actuator from the state information.

9. A disk device, comprising:

a head for at least reading data on a disk storage medium;

an actuator for positioning the head in a predetermined position of the disk storage medium;

a control unit for computing a position error from a target position of the head and a current position acquired from the head, computing an estimated position error between the position error and an estimated position of an observer, creating state information using an estimated gain of the observer according to the estimated position error, and computing a control value of the actuator from the state information; and a table for storing an estimated gain corresponding to a target position of the head, wherein the control unit acquires the estimated gain of a controller and an estimated gain of a disturbance model corresponding to the target position from the table, sets the estimated gains in the observer, and changes the disturbance suppression frequency.

10. The disk device according to claim 9, wherein the control unit changes suppression frequency characteristic of NRRO (Non Repeatable Run Out) disturbance of the observer.

11. A disk device, comprising:

a head for at least reading data on a disk storage medium;

an actuator for positioning the head in a predetermined position of the disk storage medium;

a control unit for computing a position error from a target position of the head and a current position acquired from the head, computing an estimated position error between the position error and an estimated position of an observer, creating state information using an estimated gain of the observer according to the estimated position error, and computing a control value of the actuator from the state information; and a table for storing an estimated gain corresponding to a target position of the head, wherein the control unit acquires the estimated gain corresponding to the target position from the table, sets the estimated gain in the observer, and changes the disturbance suppression frequency, wherein the control unit changes suppression frequency characteristic of NRRO (Non Repeatable Run Out) disturbance of the observer, wherein the control unit acquires an estimated gain corresponding to the position of the head on the disk in the radius direction from the table, and changes suppression frequency characteristic of wind disturbance of the observer.

12. A disk device, comprising:

a head for at least reading data on a disk storage medium;

an actuator for positioning the head in a predetermined position of the disk storage medium;

a control unit for computing a position error from a target position of the head and a current position acquired from the head, computing an estimated position error between the position error and an estimated position of an observer, creating state information using an estimated gain of the observer according to the estimated position error, and computing a control value of the actuator from the state information; and a table for storing an estimated gain corresponding to a target position of the head, wherein the control unit acquires the estimated gain corresponding to the target position from the table, sets the estimated gain in the observer, and changes the disturbance suppression frequency, wherein the control unit changes suppression frequency characteristic of NRRO (Non Repeatable Run Out) disturbance of the observer, wherein the control unit acquires an estimated gain corresponding to a head number which indicates a position of the disk face corresponding to the head, and changes a peak of the suppression frequency of the observer.

13. A disk device, comprising:
a head for at least reading data on a disk storage medium;
an actuator for positioning the head in a predetermined position of the disk storage medium;
a control unit for computing a position error from a target position of the head and a current position acquired from the head, computing an estimated position error between the position error and an estimated position of an observer, creating state information using an estimated gain of the observer according to the estimated position error, and computing a control value of the actuator from the state information; and
a table for storing an estimated gain corresponding to a target position of the head
wherein the control unit acquires the estimated gain corresponding to the target position from the table, sets the estimated gain in the observer, and changes the disturbance suppression frequency,
wherein the control unit creates state information using an estimated gain of a controller and an estimated gain of a disturbance model defined by a transfer function for which a denominator is a numerator of a filter, of which degrees of a denominator and the numerator are the same, for shaping a sensitivity function, and computes the control value including a disturbance suppression value of the actuator from the state information.

14. The disk device according to claim 13, wherein the control unit creates state information using an estimated gain of the controller according to the estimated position error, computes a control value of the actuator from the state information, creates state information using an estimated gain of a disturbance model defined by a transfer function for which a denominator is a numerator of a filter, of which degrees of a denominator and the numerator are the same, for shaping a sensitivity function according to the estimated position error, computes a disturbance suppression value of the actuator from the state information, and adds the control value and the disturbance suppression value to compute a drive value of the actuator.

15. The disk device according to claim 14, wherein the control unit creates state information using an estimated gain of a disturbance model having a zero point of the numerator of the filter shaping the sensitivity function according to a desired disturbance frequency as a pole, and computes the disturbance suppression value of the actuator from the state information.

16. The disk device according to claim 14, wherein the control unit creates state information using an estimated gain of a disturbance model for which a denominator is the numerator of the first degree or second degree filter for shaping a sensitivity function according to a desired disturbance frequency, and computes a disturbance suppression value of the actuator from the state information.

17. A head position control device for positioning a head for at least reading data of a disk storage medium in a predetermined position of the disk storage medium by controlling an actuator, comprising:
a control unit for computing an estimated position error between a target position of the head and a current position acquired from the head, creating state information using an estimated gain of an observer according to an estimated position error between the position error and an estimated position of the observer, and computing a control value of the actuator from the state information; and
a table for storing an estimated gain corresponding to a target position of the head,
wherein the control unit acquires the estimated gain of a controller and an estimated gain of a disturbance model corresponding to the target position from the table, sets the estimated gains in the observer, and changes the disturbance suppression frequency.

18. The head position control device according to claim 17, wherein the control unit changes the suppression frequency characteristic of NRRO (Non Repeatable Run Out) disturbance of the observer.

19. A head position control device for positioning a head for at least reading data of a disk storage medium in a predetermined position of the disk storage medium by controlling an actuator, comprising:
a control unit for computing an estimated position error between a target position of the head and a current position acquired from the head, creating state information using an estimated gain of an observer according to an estimated position error between the position error and an estimated position of the observer, and computing a control value of the actuator from the state information; and
a table for storing an estimated gain corresponding to a target position of the head,
wherein the control unit acquires the estimated gain corresponding to the target position from the table, sets the estimated gain in the observer, and changes the disturbance suppression frequency,
wherein the control unit changes the suppression frequency characteristic of NRRO (Non Repeatable Run Out) disturbance of the observer,
wherein the control unit acquires an estimated gain corresponding to the position of the head on the disk in the radius direction from the table, and changes suppression frequency characteristic of wind disturbance of the observer.

20. A head position control device for positioning a head for at least reading data of a disk storage medium in a predetermined position of the disk storage medium by controlling an actuator, comprising:
a control unit for computing an estimated position error between a target position of the head and a current position acquired from the head, creating state information using an estimated gain of an observer according to an estimated position error between the position error and an estimated position of the observer, and computing a control value of the actuator from the state information; and
a table for storing an estimated gain corresponding to a target position of the head,
wherein the control unit acquires the estimated gain corresponding to the target position from the table, sets the estimated gain in the observer, and changes the disturbance suppression frequency,
wherein the control unit changes the suppression frequency characteristic of NRRO (Non Repeatable Run Out) disturbance of the observer,
wherein the control unit acquires an estimated gain corresponding to a head number which indicates a position of the disk face corresponding to the head, and changes a peak of the suppression frequency of the observer.

21. A head position control device for positioning a head for at least reading data of a disk storage medium in a predetermined position of the disk storage medium by controlling an actuator, comprising:
a control unit for computing an estimated position error between a target position of the head and a current position acquired from the head, creating state information using an estimated gain of an observer according to an estimated position error between the position error and an estimated position of the observer, and computing a control value of the actuator from the state information; and a table for storing an estimated gain corresponding to a target position of the head, wherein the control unit acquires the estimated gain corresponding to the target position from the table, sets the estimated gain in the observer, and changes the disturbance suppression frequency, wherein the control unit creates state information using an estimated gain of a controller and an estimated gain of a disturbance model defined by a transfer function for which a denominator is a numerator of a filter, of which degrees of a denominator and the numerator are the same, for shaping a sensitivity function, and computes the control value including a disturbance suppression value of the actuator from the state information.

22. The head position control device according to claim 21, wherein the control unit creates state information using an estimated gain of the controller according to the estimated position error, computes a control value of the actuator from the state information, creates state information using an estimated gain of a disturbance model defined by a transfer function for which a denominator is a numerator of a filter, of which degrees of a denominator and the numerator are the same, for shaping a sensitivity function according to the estimated position error, computes a disturbance suppression value of the actuator from the state information, and adds the control value and the disturbance suppression value to compute a drive value of the actuator.

23. The head position control device according to claim 21, wherein the control unit creates state information using an estimated gain of a disturbance model having a zero point of the numerator of the filter shaping the sensitivity function according to a desired disturbance frequency as a pole, and computes the disturbance suppression value of the actuator from the state information.

24. The head position control device according to claim 21, wherein the control unit creates state information using an estimated gain of a disturbance model, for which a denominator is the numerator of the first degree or second degree filter for shaping a sensitivity function according to a desired disturbance frequency, and computes a disturbance suppression value of the actuator from the state information.

* * * * *